US011508049B2

(12) United States Patent
Seo et al.

(10) Patent No.: US 11,508,049 B2
(45) Date of Patent: Nov. 22, 2022

(54) DEEP NEURAL NETWORK PROCESSING FOR SENSOR BLINDNESS DETECTION IN AUTONOMOUS MACHINE APPLICATIONS

(71) Applicant: NVIDIA Corporation, San Jose, CA (US)

(72) Inventors: Hae-Jong Seo, San Jose, CA (US); Abhishek Bajpayee, San Jose, CA (US); David Nister, San Jose, CA (US); Minwoo Park, San Jose, CA (US); Neda Cvijetic, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 366 days.

(21) Appl. No.: 16/570,187

(22) Filed: Sep. 13, 2019

(65) Prior Publication Data
US 2020/0090322 A1   Mar. 19, 2020

Related U.S. Application Data

(60) Provisional application No. 62/730,652, filed on Sep. 13, 2018.

(51) Int. Cl.
*G06K 9/00* (2022.01)
*G06T 7/00* (2017.01)
(Continued)

(52) U.S. Cl.
CPC .......... *G06T 7/0002* (2013.01); *G06K 9/6228* (2013.01); *G06K 9/6262* (2013.01);
(Continued)

(58) Field of Classification Search
CPC ......... G06T 7/0002; G06T 2207/10016; G06T 2207/20081; G06T 2207/20084;
(Continued)

(56) References Cited

U.S. PATENT DOCUMENTS 8,854,455 B2   10/2014   Haug
9,098,754 B1 *  8/2015   Stout .................. G06K 9/00805
(Continued)

OTHER PUBLICATIONS

Wu Q, Zhang W, Kumar BV. Raindrop detection and removal using salient visual features. In2012 19th IEEE International Conference on Image Processing, IEEE, pp. 941-944, Sep. 30, 2012.*
(Continued)

*Primary Examiner* — Samir A Ahmed
(74) *Attorney, Agent, or Firm* — Taylor English Duma L.L.P.

(57) ABSTRACT

In various examples, a deep neural network (DNN) is trained for sensor blindness detection using a region and context-based approach. Using sensor data, the DNN may compute locations of blindness or compromised visibility regions as well as associated blindness classifications and/or blindness attributes associated therewith. In addition, the DNN may predict a usability of each instance of the sensor data for performing one or more operations—such as operations associated with semi-autonomous or autonomous driving. The combination of the outputs of the DNN may be used to filter out instances of the sensor data—or to filter out portions of instances of the sensor data determined to be compromised—that may lead to inaccurate or ineffective results for the one or more operations of the system.

14 Claims, 14 Drawing Sheets

(51) Int. Cl.
G06K 9/62 (2022.01)
G06N 3/04 (2006.01)
G06N 3/08 (2006.01)
G06V 10/98 (2022.01)

(52) U.S. Cl.
CPC ............. G06K 9/6267 (2013.01); G06N 3/04 (2013.01); G06N 3/08 (2013.01); G06V 10/993 (2022.01); G06T 2207/10016 (2013.01); G06T 2207/20081 (2013.01); G06T 2207/20084 (2013.01); G06T 2207/30168 (2013.01)

(58) Field of Classification Search
CPC .... G06K 9/036; G06K 9/6228; G06K 9/6262; G06K 9/6267; G06N 3/04; G06N 3/08
See application file for complete search history.

(56) References Cited

U.S. PATENT DOCUMENTS

| | | | |
|---|---|---|---|
| 9,465,987 | B1 | 10/2016 | Bell et al. |
| 10,308,260 | B2* | 6/2019 | Fleck ................. B60W 50/045 |
| 10,885,698 | B2 | 1/2021 | Muthler et al. |
| 2015/0220792 | A1* | 8/2015 | Strauss ............... G06K 9/4661 382/104 |
| 2016/0210383 | A1* | 7/2016 | Alaniz ................... G06F 30/20 |
| 2016/0210775 | A1* | 7/2016 | Alaniz ................. G05D 1/0088 |
| 2016/0247290 | A1 | 8/2016 | Liu et al. |
| 2016/0321074 | A1 | 11/2016 | Hung et al. |
| 2017/0293808 | A1* | 10/2017 | Jain .................... G06K 9/00791 |
| 2018/0079425 | A1* | 3/2018 | Fleck .................. G05D 1/0061 |
| 2018/0121273 | A1 | 5/2018 | Fortino et al. |
| 2019/0049968 | A1* | 2/2019 | Dean ................... G05D 1/0088 |
| 2019/0064799 | A1* | 2/2019 | Amirloo Abolfathi ...................... G05D 1/0055 |
| 2019/0156154 | A1* | 5/2019 | Tu ........................ G06N 3/0454 |
| 2019/0347525 | A1* | 11/2019 | Liem ........................ G06K 9/20 |
| 2020/0074266 | A1* | 3/2020 | Peake ................... G01S 17/931 |

OTHER PUBLICATIONS

"Methodology of Using a Single Controller (ECU) For a Fault-Tolerant/Fail-Operational Self-Driving System", U.S. Appl. No. 62/524,283, filed Jun. 23, 2017.
"Systems and Methods for Safe and Reliable Autonomous Vehicles" U.S. Appl. No. 62/584,549, filed Nov. 10, 2017.
"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 32/630,445, filed Feb. 14, 2018.
"Methods for accurate real-time object detection and for determining confidence of object detection suitable for autonomous vehicles" U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles" U.S. Appl. No. 62/643,665, filed Mar. 15, 2018.
"Deep Neural Network for Estimating Depth from Stereo Using Semi-Supervised Learning", U.S. Appl. No. 62/646,148, filed Mar. 21, 2018.
"System and Methods for Advanced AI-Assisted Vehicles", U.S. Appl. No. 62/648,358, filed Mar. 26, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"Methods for High-Precision, High-Accuracy Lane Detection in Autonomous Driving Applications", U.S. Appl. No. 62/699,669, filed Jul. 17, 2018.
International Preliminary Report on Patentability received for PCT Application No. PCT/US2019/051097, dated Mar. 25, 2021, 13 pages.
Machot, F. AI., et al., "Real-time raindrop detection based on cellular neural networks for ADAS," Journal of Real-Time Image Processing, Mar. 26, 2016, pp. 14.
International Search Report and Written Opinion received for PCT Patent Application No. PCT/US2019/051097, dated Sep. 8, 2020, 17 pages.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Invitation to Pay Additional Fees received for PCT Application No. PCT/US2019/051097, dated Jul. 16, 2020, 12 pages.
"Programmable Vision Accelerator", U.S. Appl. No. 15/141,703, filed Apr. 28, 2016.
"Reliability Enhancement Systems and Methods" U.S. Appl. No. 15/338,247, filed Oct. 28, 2016.
"Visibility Distance Estimation Using Deep Learning in Autonomous Machine Applications" U.S. Appl. No. 17/449,306, Abhishek Bajpayee et al., filed on Sep. 29, 2021.

* cited by examiner

DEEP NEURAL NETWORK PROCESSING FOR SENSOR BLINDNESS DETECTION IN AUTONOMOUS MACHINE APPLICATIONS

CROSS-REFERENCE TO RELATED APPLICATIONS

This application claims the benefit of U.S. Provisional Application No. 62/730,652, filed on Sep. 13, 2018, which is hereby incorporated by reference in its entirety.

BACKGROUND

Autonomous driving systems and advanced driver assistance systems (ADAS) may leverage sensors, such as cameras, to perform various tasks—such as lane keeping, lane changing, lane assignment, camera calibration, and localization. For example, for autonomous and ADAS systems to operate independently and efficiently, an understanding of the surrounding environment of the vehicle in real-time or near real-time may be generated. To accurately and efficiently understand the surrounding environment of the vehicle, it is imperative for the sensors to generate usable, unobscured sensor data (e.g., images, depth maps, etc.). However, a sensor's ability to perceive the surrounding environment may be compromised by a variety of sources—such as sensor blockage (e.g., from debris, precipitation, etc.) or blur—which may lead to sensor blindness. Potential causes of sensor blindness may include snow, rain, glare, sun flares, mud, water, signal failure, and the like.

Conventional systems for addressing sensor blindness have used feature-level approaches to detect individual pieces of visual evidence of sensor blindness, and subsequently pieced these features together to determine that a sensor blindness event exists. These conventional methods primarily rely on computer vision techniques—such as by analyzing the absence of sharp edge features (e.g., sharp changes in gradient, color, intensity) in regions of the image, using color-based pixel analysis or other low-level feature analysis to detect potential sensor blockage, and/or binary support vector machine classification with a blind versus not blind output. However, such feature-based computer vision techniques require separate analysis of each feature—e.g., whether each feature is relevant to sensor blindness or not—as well an analysis of how to combine the different features for a specific sensor blindness condition, thereby limiting the scalability of such approaches due to the complexity inherent to the large variety and diversity of conditions and occurrences that can compromise data observed using sensors in real-world situations. For example, due to the computational expense of executing these conventional approaches, they are rendered ineffective for real-time or near real-time deployment.

Further, conventional systems may be unable to differentiate between different types of sensor blindness, such as whether an image is blurred or occluded. By treating each type of sensor blindness equally, less egregious or detrimental types may cause an instance of sensor data to be deemed unusable even where this determination may not be entirely accurate (e.g., a blurred image may be usable for some operations while an occluded image may not). Moreover, by leveraging computer vision techniques that are hard-coded, conventional systems may be unable to learn from historical data, or to learn over time in deployment, thereby limiting the ability of these systems to adapt to new types or occurrences of sensor blindness conditions.

SUMMARY

Embodiments of the present disclosure relate to deep neural network processing for sensor blindness detection in autonomous machine applications. Systems and methods are disclosed that use region and context-based detection techniques to detect and classify blindness regions within images—or other sensor data representations—of an environment for use by autonomous vehicles, semi-autonomous vehicles, water vessels, robots, and/or other object types in making autonomous or semi-autonomous control decisions.

In contrast to conventional systems, such as those described above, the system of the present disclosure may implement a deep learning solution (e.g., using a deep neural network (DNN), such as a convolutional neural network (CNN)) that detects and predicts contextual information indicative of sensor blindness to help inform decision making as to the usability of collected sensor data—e.g., whether sensor data is unusable, usable, and/or a degree of usability. In further contrast to conventional systems, the system of the present disclosure may identify sensor blindness using a region-based approach by leveraging machine-learned importance of blindness in certain regions. The blindness regions of the present disclosure may refer to any explicit or implied regions represented by the sensor data, which may include, without limitation, a driving surface region, an ego-vehicle region, a sky region, etc.

Using the approaches described herein, the identification and classification of sensor blindness regions (e.g., regions with compromised visibility or other impairment) may be possible in environments where conventional approaches are unreliable or would otherwise fail—such as where the sky or the ego-vehicle is the cause of blindness, and such blindness is not actual fatal to the usability of the sensor data. In addition, in embodiments where a DNN is used, the output of the DNN may include regions represented by the sensor data that are identified as unusable by the system—requiring little to no post-processing—to determine whether the blindness is in a region where it may be fatal for driving purposes. As a direct result, and compared to conventional systems, substantial computing power may be saved and processing requirements may be reduced—thereby speeding up run-time to allow for real-time deployment while simultaneously reducing the overall burden on the system.

BRIEF DESCRIPTION OF THE DRAWINGS

The present systems and methods for deep neural network processing for sensor blindness detection in autonomous machine applications are described in detail below with reference to the attached drawing figures, wherein.

DETAILED DESCRIPTION

Figure 1:
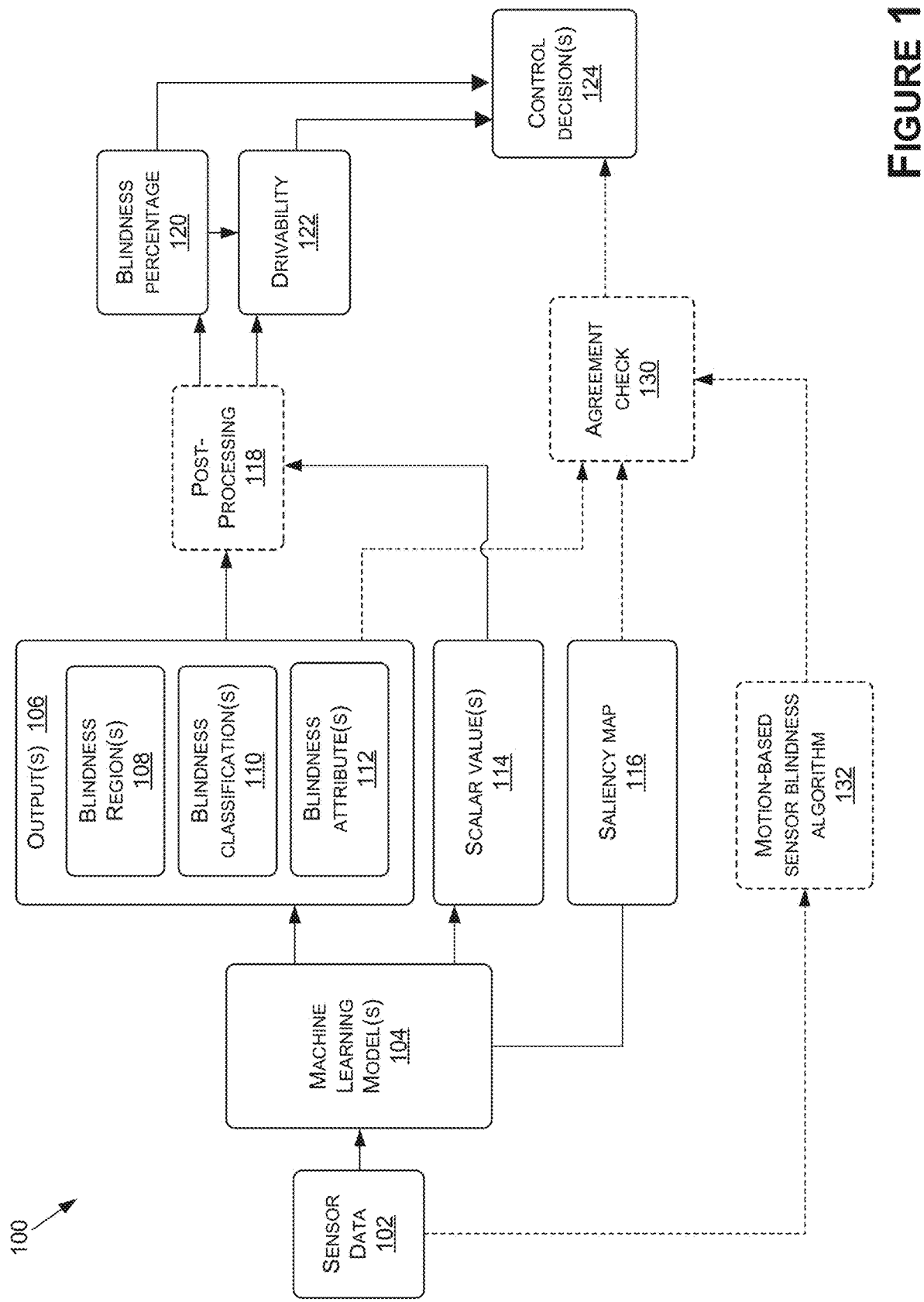
FIG. 1 is an example data flow diagram illustrating an example process for detecting and classifying sensor blindness in autonomous machine applications, in accordance with some embodiments of the present disclosure.

Systems and methods are disclosed related to deep neural network processing for sensor blindness detection in autonomous machine applications. The systems and methods described herein may be used in augmented reality, virtual reality, robotics, security and surveillance, medical imaging, autonomous or semi-autonomous machine applications, and/or any other technology spaces where sensor blindness detection may be implemented. Although the present disclosure may be described with respect to an example autonomous vehicle 700 (alternatively referred to herein as "vehicle 700" or "autonomous vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types.

Camera Blindness Detection in Deployment

As described herein, in contrast to conventional approaches to sensor blindness detection, the current system detects and classifies sensor blindness using machine learning models trained to analyze multiple features of an image in real-time or near real-time. For example, deep neural network (DNN) processing may be used to detect sensor blindness and to classify the causes—which may be multiple for an individual image—of the blindness. For example, two or more different regions of an image may be classified as blind or partially blind, and a cause—e.g., blurred, occluded, etc.—may be predicted by the DNN. In addition, the DNN may be trained to generate a binary—e.g., true or false—output indicating whether the sensor data is considered to be useful for the specific application (e.g., autonomous or semi-autonomous (ADAS) driving). An output of the DNN may include, in some embodiments, a saliency map that represents the specific regions in the image where the DNN has detected blindness. By more accurately identifying and classifying sensor blindness in multiple regions of the sensor data representations (e.g., images, depth maps, etc.)—e.g., substantially simultaneously, in embodiments—the process of determining sensor blindness and its causes may be comparatively less computationally expensive than conventional systems.

With reference to detecting and classifying sensor blindness and its causes, sensor data (e.g., representative of images from image sensors, depth maps from LIDAR sensors, etc.) may be received from sensors (e.g., cameras, LIDAR sensors, RADAR sensors, etc.) disposed on or otherwise associated with a vehicle. The sensor data may be applied to a neural network (e.g., a DNN, such as a convolutional neural network (CNN)) that may be trained to identify areas of interest within a sensor data representation pertaining to sensor blindness, as well as to identify causes thereof (e.g., blurred, blocked, etc.). More specifically, the neural network may be a DNN designed to infer blindness markers and output classifications that identify where in the sensor data the potential sensor blindness may be located, a cause of the sensor blindness, and whether the sensor data, or a portion thereof, is usable by the system.

In some examples, the DNN may output a number of channels corresponding to a number of classifications desired. For example, the channels may correspond to labeling classes such as blocked area, blurred area, reflection area, open area, vehicle, sky, frame label, etc., and may further correspond to attributes of the labeling classes, such as rain, glare, broken lens, light, mud, paper, person, etc. In some examples, the neural network may further output a binary decision (e.g., True/False, Yes/No, 0/1) indicating that the sensor data is at least partially usable (e.g., true, yes, 0) and a second decision indicating that the sensor data is not usable (e.g., false, no, 1). Where the data is indicated as being not usable, the sensor data may be skipped over, disregarded, and/or used to make a determination to hand control back to a driver in autonomous or semi-autonomous applications.

Once the blindness regions, classifications, and/or binary decision(s) are output by the DNN, any number of post-processing steps may be performed to ultimately determine whether sensor blindness in the sensor data is fatal or unusable. In some examples, post-processing may be performed on the outputs of the DNN to determine a blindness percentage and, when the blindness percentage is over a pre-determined threshold, a determination may be made that the sensor data may not be suitable for use by a vehicle for autonomous or semi-autonomous driving. In such examples, corrective measures may be taken, such as to hand over control of the vehicle to the driver.

In some embodiments, the DNN may generate a saliency map per image frame that may designate spatial regions of an image that the DNN has determined to be important for autonomous or semi-autonomous driving. For example, the DNN may learn (e.g., during training) that a road in an image is a more important region, while the sky or trees are associated with regions that are less important. In addition, in some examples, a motion-based sensor blindness detection algorithm may be used to further validate the results of the DNN. The motion-based sensor blindness algorithm may leverage feature tracking between consecutive images over time to determine sensor blindness in regions of an image. Motion feature analysis over a region of pixel blocks may be performed to determine a likelihood of a region including sensor blindness. In some examples, a Kanade-Lucas-Tomasi (KLT) based algorithm may be used for motion tracking analysis. In such examples, few or no features may be generated in an image if the image is blurred or blocked in a number of consecutive images over time. A number of feature tracks for each non-overlapping pixel block as well as the number of consecutive images over which features in the block have been detected may be analyzed. As such, if many feature tracks have been detected over time, the likelihood of the pixel block being blurred or blocked is considered low. The number of blocked or blurred pixel blocks may be counted to determine a percentage of the overall image that is impaired by sensor blindness. This percentage may be compared with the blindness percentage output by the DNN—e.g., using an agreement check component, or agreement verifier—to check the accuracy of the results of the DNN with respect to important regions of the image as determined using the saliency map.

With reference to FIG. 1, FIG. 1 is an example data flow diagram illustrating an example process 100 for sensor blindness detection in autonomous machine applications, in accordance with some embodiments of the present disclosure. While the detection types primarily described herein with respect to FIG. 1 are blur or block detections, this is not intended to be limiting, and is for example purposes only. For example, the process 100 may be used to detect and classify any number of attributes and/or causes of the sensor blindness, such as those described herein, without departing from the scope of the present disclosure.

The process 100 may include generating and/or receiving sensor data 102 from one or more sensors of the vehicle 700. The sensor data 102 may be used by the vehicle 700, and within the process 100, to detect and classify sensor blindness in real-time or near real-time. The sensor data 102 may include, without limitation, sensor data 102 from any of the sensors of the vehicle 700 (and/or other vehicles or objects, such as robotic devices, VR systems, AR systems, etc., in some examples). For example, and with reference to FIGS. 7A-7C, the sensor data 102 may include the data generated by, without limitation, global navigation satellite systems (GNSS) sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 776, stereo camera(s) 768, wide-view camera(s) 770 (e.g., fisheye cameras), infrared camera(s) 772, surround camera(s) 774 (e.g., 360 degree cameras), long-range and/or mid-range camera(s) 778, speed sensor(s) 744 (e.g., for measuring the speed of the vehicle 700), and/or other sensor types. As another example, the sensor data 102 may include virtual sensor data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 104 described herein may be tested, trained, and/or validated using simulated data in a simulated environment, which may allow for testing more extreme scenarios outside of a real-world environment where such tests may be less safe.

The sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data pre-processor may use image data representative of one or more images (or other data representations) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the machine learning model(s) 104.

In some embodiments, a pre-processing image pipeline may be employed by the sensor data pre-processor to process a raw image(s) acquired by a sensor(s) (e.g., camera(s)) and included in the image data 102 to produce pre-processed image data which may represent an input image(s) to the input layer(s) of the machine learning model(s) 104. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

The machine learning model(s) 104 may use as input one or more images or other data representations (e.g., LIDAR data, RADAR data, etc.) as represented by the sensor data 102 to generate output(s) 106, a scalar value 114, and/or a saliency map 116. In a non-limiting example, the machine learning model(s) 104 may take, as input, an image(s) represented by the sensor data 102 (e.g., after pre-processing) to generate the blindness region(s) 108, blindness classification(s) 110, blindness attribute(s) 112, scalar value 114, and/or saliency map 116. Although examples are described herein with respect to using neural networks, and specifically DNNs, as the machine learning model(s) 104, this is not intended to be limiting. For example, and without limitation, the machine learning model(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The output(s) of the machine learning model(s) 104 may include the blindness output(s), scalar value 114, saliency map 116, and/or other output types. The output(s) 106 may include the blindness region(s) 108, the blindness classification(s) 110, and/or the blindness attribute(s) 112. The blindness region(s) 108 may identify where in the sensor data 102 (e.g., pixel locations) the potential sensor blindness, compromised visibility, or other impairment may be located. The blindness region(s) 108, in some non-limiting embodiments, may be output by the machine learning model(s) 104 on a pixel by pixel basis. For example, each pixel—or at least the pixel associated with a blindness prediction—may have a corresponding blindness classification(s) 110. As such, each of the pixels having an associated blindness or compromised visibility—e.g., of the same blindness classification 108 and/or in a continuous cluster or other relationship—may be determined to be a blindness region 108. In other examples, the blindness region(s) 108 may be output as pixel locations of vertices of a polygon corresponding to the blindness region(s) 108. In such an example, the blindness region(s) 108 (e.g., regions associated with compromised visibility) may have one or more associated blindness classification(s) 110 and/or blindness attribute(s) 112, and each of the pixels within the polygon defined by the blindness region(s) 108 may be determined to have the associated blindness classification(s) 110 and/or blindness attribute(s) 112. As such, the blindness region(s) 108 may be defined on a pixel by pixel basis—e.g., using clustering, or other association technique for determining blindness pixels are associated with a same region—or may be defined by vertices (e.g., pixel coordinates thereof) of polygons defining or delineating the blindness region(s) 108.

The blindness classification(s) 110 may include a number of blindness types or classes, such as but not limited to those described herein. The blindness classification(s) 110 may represent the cause(s) for blindness associated with each pixel or collection of pixels with detected blindness in the blindness region(s) 108. The sensor data representations (e.g. images, depth maps, etc.) may include any number of different blindness classifications 110. For example, a single blindness region(s) 108 or pixel may have one, two, or more associated blindness classifications 110 without departing from the scope of the present disclosure. In some examples, the machine learning model(s) 104 may output a number of channels corresponding to a number of classifications the machine learning model(s) 104 is trained to predict (e.g., each channel may correspond to one blindness classification 110). For example, the blindness classification(s) 110 may include one or more of blocked, blurred, reflection, open, ego-vehicle, sky, frame label, etc., and the number of output channels may correspond to the number of classifications desired. In some embodiments, the blindness classification(s) 110 may be output as confidence values. For example, for each pixel in blindness region(s) 108, or for each blindness region(s) 108 (or vertices thereof), confidence values may be output for each of the blindness classifications 110 the machine learning model(s) 104 is trained to predict. As a non-limiting example, if the machine learning model(s) 104 is trained to predict three blindness classifications (e.g., blurred area, blocked area, open area), there may be an output array including confidence values for each of the three blindness classification for each pixel, or each blindness region(s) 108, where blindness is detected. As a result, there may be confidence values (e.g., that correspond to the blindness classification(s) 110) for each pixel, and the blindness classification 110 with the highest confidence value for a specific pixel and/or blindness region 108 may be determined to be the blindness classification 110 for that pixel and/or blindness region 108.

The blindness attribute(s) 112 may include any number of attributes or classes, such as but not limited to those described herein. The blindness attribute(s) 112 may further classify attributes associated with each blindness classification(s) 110 determined to be associated with blindness region(s) 108 and/or the pixels included therein. The blindness attribute(s) 112, in non-limiting examples, may correspond to sub-classes (or sub-causes) of the blindness detected in specific blindness regions 108 and/or pixels. As such, in some examples, each blindness attribute 112 may be associated with at least one blindness classification 110 as an additional, more specific or descriptive, cause of the sensor blindness. The blindness attribute(s) 112 may include sub-classifications including, but not limited to, rain, glare, broken lens, light, mud, paper, person, etc. For example, a blindness classification 110 of "blocked" may be associated with one or more blindness attributes 112 such as sun, fog, water, mist, snow, frozen pane, day, night, broken lens, self-glare, mud, paper, leaf, etc. In this way, blindness attribute(s) 112 may further delineate a cause for the blindness in blindness region(s) 108 and/or pixels thereof. In some examples, the blindness attributes 112 may include sub-classes of blindness attributes 112, such as to indicate a level of compromised visibility (e.g., heavy, moderate, light, etc.). The machine learning model(s) 104 may similarly have as many output channels as the number of blindness classifications 110 and/or corresponding blindness attributes 112 that the machine learning model(s) 104 is trained to predict. This is described in more detail herein at least with respect to process 400 of FIG. 4 for training the machine learning model(s) 104.

In some embodiments, the machine learning model(s) 104 may output a scalar value 114. The scalar value 114 may include a binary decision (e.g., True/False, Yes/No, 0/1) indicating whether the sensor data is clear enough for use in one or more applications, such as with respect to one or more operations associated with autonomous or semi-autonomous driving. For example, a first decision (e.g., true, yes, 0) may indicate that the sensor data 102 is clear enough or usable for the current application, and the second decision (e.g., false, no, 1) may indicate that the sensor data 102 is not clear enough or usable for the current application. In some examples, a scalar value 114 may be output for any number of different applications and/or operations associated therewith. For example, a first scalar value 114 may correspond to whether the sensor data 102 is usable for lane detection on a driving surface and a second scalar value 114 may correspond to whether the sensor data is usable for object detection. In such examples, a number of channels output by the machine learning model(s) 104 may correspond to the number of applications and/or operations associated therewith that the machine learning model(s) 104 is trained to predict usability. The machine learning model(s) 104 may be trained—as described in more detail herein—to determine the scalar value 114 by encoding the scalar value as ground truth data.

In some embodiments, the machine learning model(s) 104 may output a saliency map 116. For example, the saliency map 116 may be generated as an output in embodiments where a motion-based sensor blindness algorithm 132 is used in combination with the saliency map 116 for an agreement check 130 (e.g., by an agreement verifier). In such embodiments, the saliency map 116 may be output by the machine learning model(s) 104 for each instance in the sensor data. The saliency map 116 may designate spatial regions of the image that the machine learning model(s) 104 has learned or determined to be important for autonomous or semi-autonomous driving (or for other applications). For example, the saliency map 116 may designate a region of the image depicting a road to be important, while another region including the sky or trees may be designated as not important. The machine learning model(s) 104 may learn over time what regions of environments as represented in the sensor data are important—e.g., for performing one or more operations with respect to semi-autonomous or autonomous driving. In some examples, the saliency map 116 may include importance values for regions of the image. A higher importance value may indicate that the respective region of the image is more important for a specific application than a region with a lower importance value. As such, the output saliency map 116 may indicate whether the blindness region(s) 108 detected from the sensor data 102 corresponds to a more/most important region or a less important region. If the blindness region(s) 108 are in a less unimportant region, the system may learn to disregard or attribute less weight to blindness in those regions. In some examples, where the scalar value 114 indicates that the sensor data 102 is unusable, but the saliency map 116 indicates that the blindness region(s) 108—as confirmed by the motion-based sensor blindness algorithm, in embodiments—are not within more important regions for performing one or more operations, the agreement check 130 may indicate a lack of agreement and may relabel or classify the sensor data 102 as usable, or may generate a signal that an error has occurred (e.g., for error checking or debugging).

In other examples, the saliency map 116 may be used to determine the regions of the sensor data that are important in an effort to reduce or filter the portions of the sensor data 102 that need to be compared by the agreement check 130. For example, the motion-based sensor blindness algorithm 130 may determine regions of the sensor data 102 that are blind, or partially blind, and the machine learning model(s) 104 may predict the blindness region(s) 108. As such, the indications of the more/most important regions from the saliency map 116 may be used to tailor or focus the agreement check 130 on important regions of the sensor data 102 when comparing the outputs of the motion-based sensor blindness algorithm 132 and the machine learning model(s) 104. This reduction or filtering for the agreement check 130 may decrease run-time and processing requirements while providing results corresponding to the regions of the sensor data 102 that are most useful for performing the operations of the system.

In some embodiments, the outputs 106 and/or the scalar value 114 may undergo post-processing 118 after being computed by the machine learning model(s) 108. The post-processing 118 may be performed to determine a blindness percentage 120 and/or drivability 122 corresponding to the sensor data 102. For example, the post processing 118 may include temporal smoothing of the outputs 106 and/or the scalar value 114 after being computed by the machine learning model(s) 104. Temporal smoothing may be used in some embodiments to improve stability of the system by reducing false positives for sensor blindness based on a single frame—by incorporating prior predictions of the machine learning model(s) 104 corresponding to temporally adjacent frames—to smooth and reduce noise in the output of the machine learning model(s) 104. In some examples, values computed by the machine learning model(s) 104 for a current instance of the sensor data 102 may be weighed against values computed by the machine learning model(s) 104 for one or more prior instances of the sensor data 102. Where the sensor data 102 is image data representative of images, for example, the outputs 106 and/or the scalar value 114 computed by the machine learning model(s) 104 for a current or most recent image may be weighed against the outputs 106 and/or the scalar value 114 computed by the machine learning model(s) 104 for one or more temporally adjacent—e.g., previous and/or sequential—images. As such, final values (e.g., for the blindness region(s) 108, or pixels thereof, the blindness classification(s) 110, the blindness attribute(s) 112, and/or the scalar value(s) 114) corresponding to an instance of the sensor data 102 may be determined by weighting prior values associated with one or more other instances of the sensor data 102 against current values associated with the instance of the sensor data 102.

In some embodiments, the post processing 118 may further include a spatial post-processing of the outputs 106. Spatial post-processing may include emphasizing image regions that are more important than others for a given application and/or operations associated therewith (e.g., lane detection or object detection for autonomous or semi-autonomous driving). In some examples, this may include assigning or determining an importance value to each region of an environment of the vehicle 700. The importance values may indicate importance of the region relative to other regions. In some examples, a region-based mask may be created that associates masks with regions in the image based on the importance of the respective regions. This may allow the system to selectively determine usability, or lack thereof, of an image based the blindness region(s) 108 or pixels associated therewith in the image (or other sensor data representation) where blindness is detected.

The results of the temporal smoothing and/or the spatial post-processing 118 may be analyzed to determine the blindness percentage 120 and the drivability 122 with respect to the sensor data 102. Where post-processing 118 is not implemented, the blindness percentage 120 and/or the drivability 122 may be determined based solely on the outputs corresponding to a current instance of the sensor data 102. The blindness region(s) 108 may be used to determine the blindness percentage 120 in an image. In some examples, the pixels with the blindness classification(s) 110 determined to be part of a blocked area and/or a blurred area may be used to compute an overall blindness percentage of pixels in the image that correspond to camera blindness. In some examples, pixels in the blindness region(s) 108 that are not important for autonomous or semi-autonomous driving (or other applications) may be removed from consideration for calculating the blindness percentage 120. In some examples, the drivability 122 may be determined based at least in part on the blindness percentage 120 being below a predetermined threshold and/or based on the scalar value 114 (e.g., where the scalar value 114 indicates the sensor data 102 is unusable, the drivability 122 may be 0, and where the scalar value 114 indicates the sensor data 102 is usable, the drivability may be a percentage, or score, corresponding to a degree of drivability 122). In other examples, the drivability 122 may be solely determined based on the scalar value(s) 114. As such, the drivability 122 may indicate whether an instance of the sensor data 102 is clear enough, or usable, for a given application or operation(s) associated therewith. In some embodiments, the drivability 122 may include a binary decision indicating whether the image is useful for a given application. In any example, the blindness percentage 120 and/or the drivability 122 may be separately computed for each different application and/or operation(s) associated therewith to inform the system as to how and where the sensor data 102 may be used.

The control decision(s) 124 may be decisions made by the system in real-time or near real-time using the sensor data 102 and based on the blindness percentage 120 and/or drivability 122 (and/or directly on the outputs 106, the scalar value(s) 114, the saliency map 116, and/or outputs of the motion-based sensor blindness algorithm 132). For example, where not clear enough, or useful, some or all of the sensor data 102 may be skipped over or disregarded with respect to one or more of the control decisions 124. In some examples, such as where the sensor data 102 is unusable for safe operation of the vehicle 700, the control decision 124 may include handing control back to a driver (e.g., exiting autonomous or semi-autonomous operation), or executing an emergency or safety maneuver (e.g., coming to a stop, pulling to the side of the road, or a combination thereof). As such, the control decision(s) 124 may include suggesting one or more corrective measures for effective and safe driving—such as ignoring certain instances of the sensor data. In any example, and with respect to autonomous or semi-autonomous driving, the control decision(s) 124 may include any decisions corresponding to a sensor data manager layer of an autonomous driving software stack (alternatively referred to herein as a "drive stack"), a perception layer of the drive stack, a world model management layer of the drive stack, a planning layer of the drive stack, a control layer of the drive stack, an obstacle avoidance layer of the drive stack, and/or an actuation layer of the drive stack. As such, as described herein, the drivability 122 of the sensor data 102 may be separately determined for any number of different operations corresponding to one or more layers of the drive stack. As an example, a first drivability 122 may be determined for object detection operations with respect to the perception layer of the drive stack, and a second drivability 122 may be determined for path planning with respect to the planning layer of the drive stack.

In some embodiments, as described herein, the outputs 106, the scalar value 114, and/or the saliency map 116 may be checked against results of the motion-based sensor blindness algorithm 132 to further validate the accuracy of the results of the machine learning model 104. The motion-based sensor blindness algorithm 132 may leverage feature tracking between consecutive images over time to determine sensor blindness in regions of an image of the sensor data 102. The motion-based sensor blindness algorithm 132 may use the sensor data 102 as an input. A motion feature analysis over a region of a pixel block for every x number of pixels (e.g., two, four, six, ten, etc.) may be performed to determine a likelihood of a region including sensor blindness. In some examples, a Kanade-Lucas-Thomas (KLT) based algorithm (or another algorithm type) be used for the motion tracking analysis of each pixel block over consecutive frames. In such examples, the motion-based sensor blindness algorithm 132 may determine or generate few or no features corresponding to an image if the image is blurred or blocked in consecutive images over time. A number of feature tracks for each non-overlapping pixel block, as well as the number of consecutive images over which features in the block have been detected, may be analyzed. As such, if many feature tracks have been detected over time, the likelihood of the pixel block being blurry or blocked is considered low. This may be a result of the dependence of the motion-based sensor blindness algorithm 132 on sharp edges (e.g., high spatial and intensity gradients) that are present over time in regions of the images. The number of blocked or blurred pixel blocks may be counted to determine a percentage of the overall image that is impaired by sensor blindness. If the number and/or the percentage of pixels blocked or blurred is over a threshold, the corresponding image may be considered to be not useful or fatal for autonomous or semi-autonomous driving (or other applications). In some examples, the motion-based sensor blindness algorithm 132 may also be configured to remove false positives of features found in the sky region of the images, as the sky region may be deemed unimportant from a sensor blindness perspective for certain applications. False positive removal may be performed using a color-based analysis that includes detecting a range of blues in the Red-Blue-Green (RGB) color spectrum for pixels in the region of the image where the sky region is expected to be present. As such, the motion-based sensor blindness algorithm 132 may output the location of and/or percentage of blocked or blurred pixels in the image, and/or may output a binary decision indicating whether the image is useful for efficient and safe autonomous or semi-autonomous driving.

As described herein, the agreement check 130 may, in some non-limiting embodiments, use the percentage of blurred or blocked pixels determined and/or the binary decision by the motion-based sensor blindness algorithm 132 to check against the outputs 106 and/or scalar value(s) 114 computed by the machine learning model(s) 104. This percentage of blocked or blurred pixels may be compared with the blindness percentage 120 to check the accuracy of the results of the machine learning model(s) 104 with respect to important regions of the image as determined using the saliency map 114. In such examples, drivability 122 and thus the control decision(s) 124 may be determined based on the outcome of the agreement check 130. For example, if the percentage of blurred or blocked pixels from the motion-based sensor blindness algorithm 132 is within a certain threshold of the blindness percentage 120, the control decision(s) 124 may be made as described above. This allows the system to perform accuracy checks to cross-check determinations by the machine learning model(s) 104 with respect to camera blindness to reduce false positives. In some examples, the saliency map 116 and the motion-based sensor blindness algorithm 132 may be deployed for error checking or debugging. In such examples, the saliency map 116 and/or the motion-based sensor blindness algorithm 132 may not be implemented at all times (e.g., may be implemented periodically, at an interval, prior to deployment, during training, and/or the like).

Figure 2A:
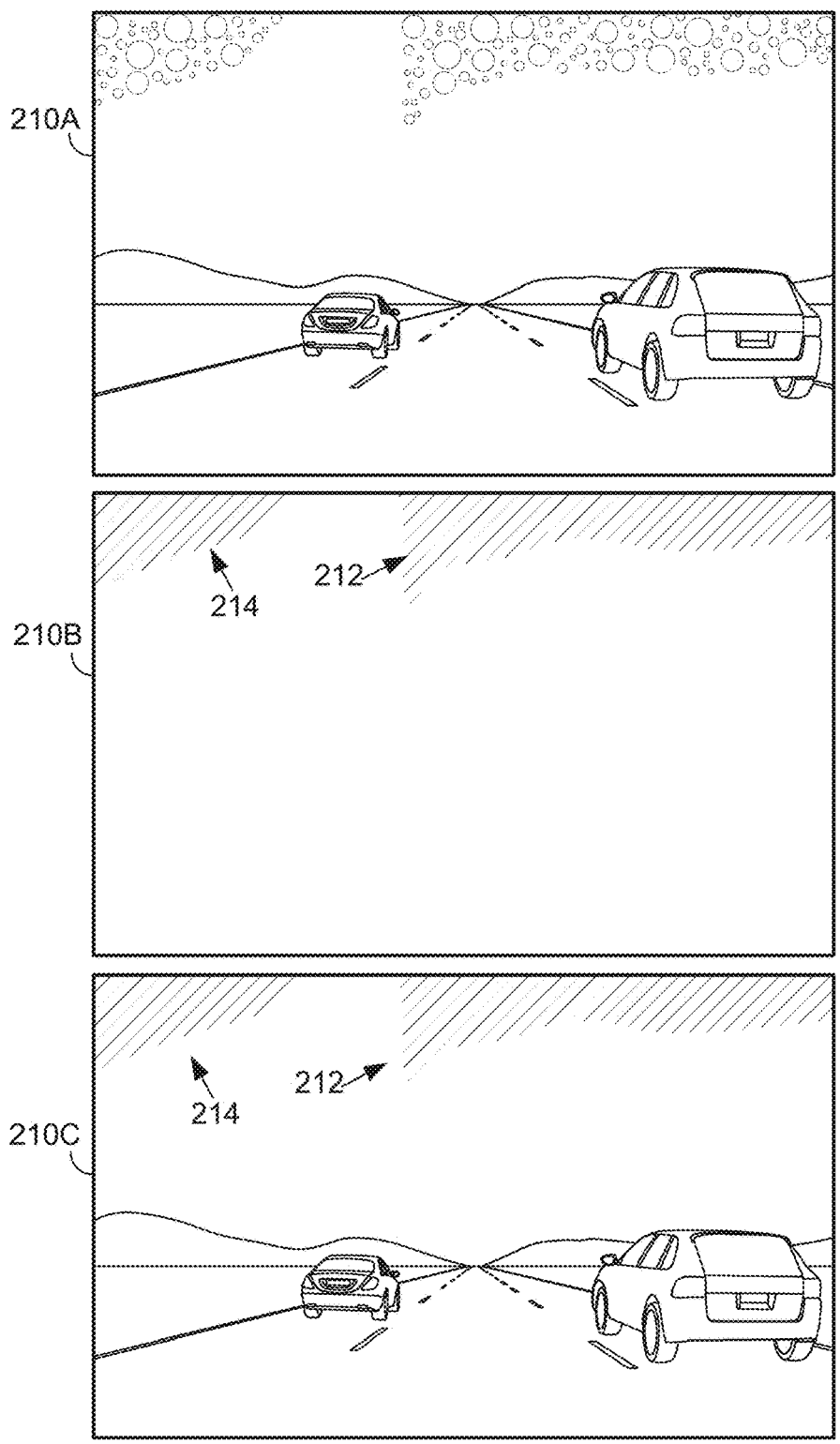
FIGS. 2A-2C include example illustrations of outputs of a machine learning model with respect to sensor blindness, in accordance with some embodiments of the present disclosure.

Now referring to FIG. 2A, FIG. 2A is an illustration of example output of a machine learning model with respect to sensor blindness, in accordance with some embodiments of the present disclosure. For example, the machine learning model(s) 104 may use image data representative of input image 210A as input and may output an image mask 210B including the image blindness regions 212 and 214. In one or more embodiments, the upper portions of the image 210A may be obscured or blurred by precipitation (as depicted in FIG. 2A), debris, or glare or reflections from sunlight. The different classification may be represented by different RGB colors or indicators. The image mask 210B may be generated based on the blindness region(s) 108 and associated blindness classification(s) 110 and/or blindness attribute(s) 112 computed by the machine learning model(s) 104. For example, depending on the magnitude, density (e.g., proportionate to the size of the entire affected region) and/or degree of translucency of the visually-compromised region(s), the blindness region 212 may be classified as a blocked or blurred area, and the blindness region 214 may also be classified as a blocked or blurred area. The pixels in blindness regions 212 and 214 may be similarly classified as blocked or blurred pixels. The blindness classifications 110 may include confidence values that represent a likelihood or confidence for each blindness region 212 and 214 that the region corresponds to a certain blindness classification 110. In addition to the blindness classifications 110, the blindness regions 212 and 214 may also have associated blindness attributes 112. For example, the blurred classification may have associated attributes such as glare and/or light (as in moderate). Visualization 210C illustrates image 210A with the image mask 210B overlaid. In this way, sensor blindness may be accurately determined and visualized in a region-specific manner. For example, with respect to the image 210A, the determination of drivability 122 may be high, such that the image 210A is useful for autonomous or semi-autonomous driving operations. This may be because only a portion—as indicated by the blindness percentage 120, for example—of the image 210A is blurred, and the portion is in a sky of the environment where the control decision(s) 124 may not be affected.

Figure 2B:
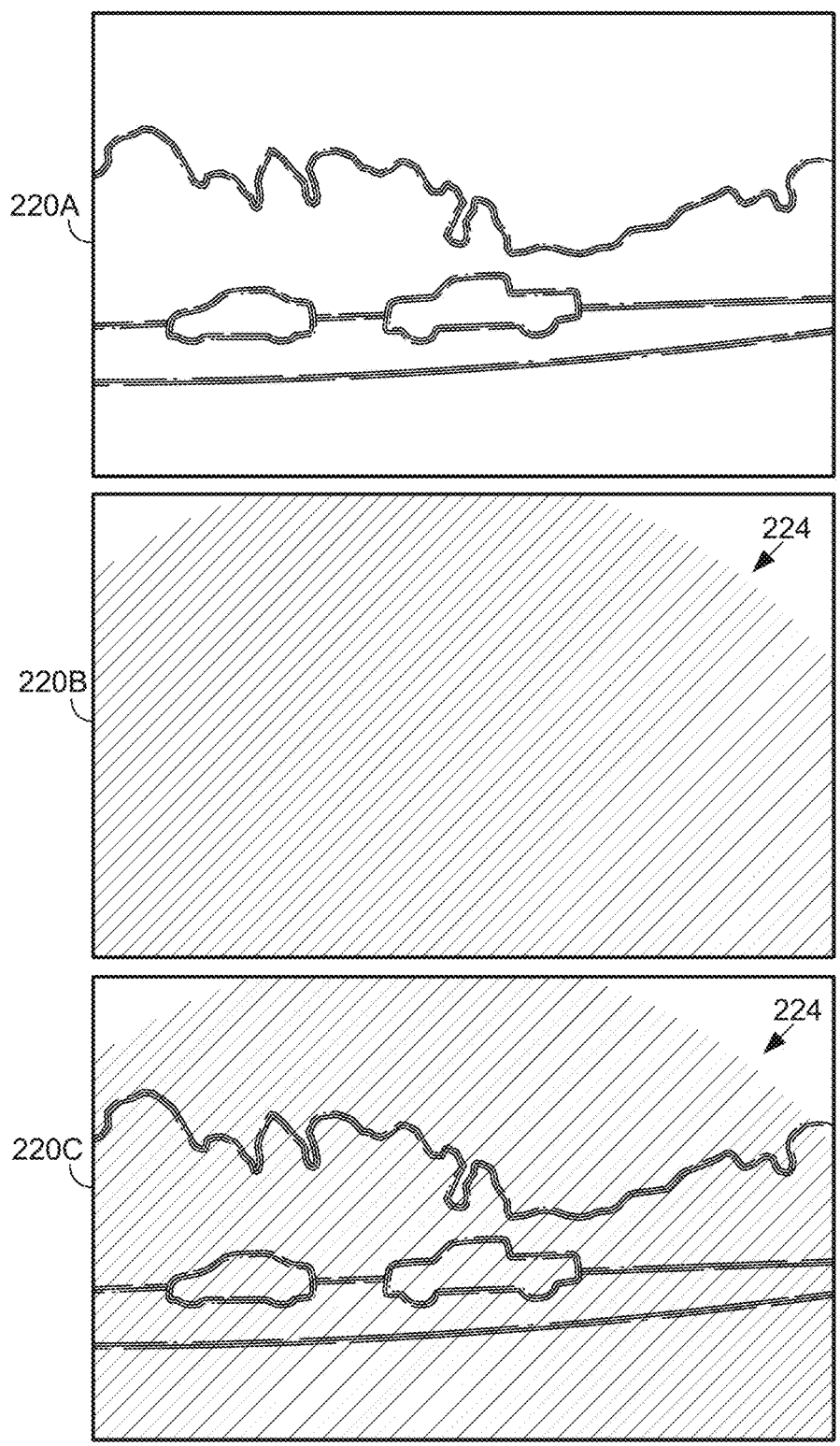

With reference to FIG. 2B, FIG. 2B is another example output of a machine learning model with respect to sensor blindness, in accordance with some embodiments of the present disclosure. For example, the machine learning model(s) 104 may use image data representative of input image 220A as input and may output an image mask 220B including the image blindness region 224. In some example scenarios, the majority of the image 220A may be obscured or blurred by precipitation, debris, or glare or reflections from sunlight (as indicated by the blurred representations of vehicles and the surrounding environment in the image 220A). The image mask 220B may be generated based on the blindness region(s) 108 and associated blindness classification(s) 110 and/or blindness attribute(s) 112 computed by the machine learning model(s) 104. For example, the blindness region 224 may be classified as a blurred area and the pixels in the blindness region 224 may be classified as blurred pixels. In addition to the blindness classifications 110, the blindness region 224 may also have associated blindness attributes 112. For example, the blurred classification may have associated attributes such as glare and/or heavy (indicating a heavy glare). Visualization 220C illustrates image 220A with the image mask 220B overlaid. For example, with respect to the image 220A, the determination of drivability 122 may be low, such that the image 220A is not useful for autonomous or semi-autonomous driving operations. This may be because a large portion—as indicated by the blindness percentage 120, for example—of the image 220A is blurred, and the portion includes the driving surface where the control decision(s) 124 may be affected.

Figure 2C:
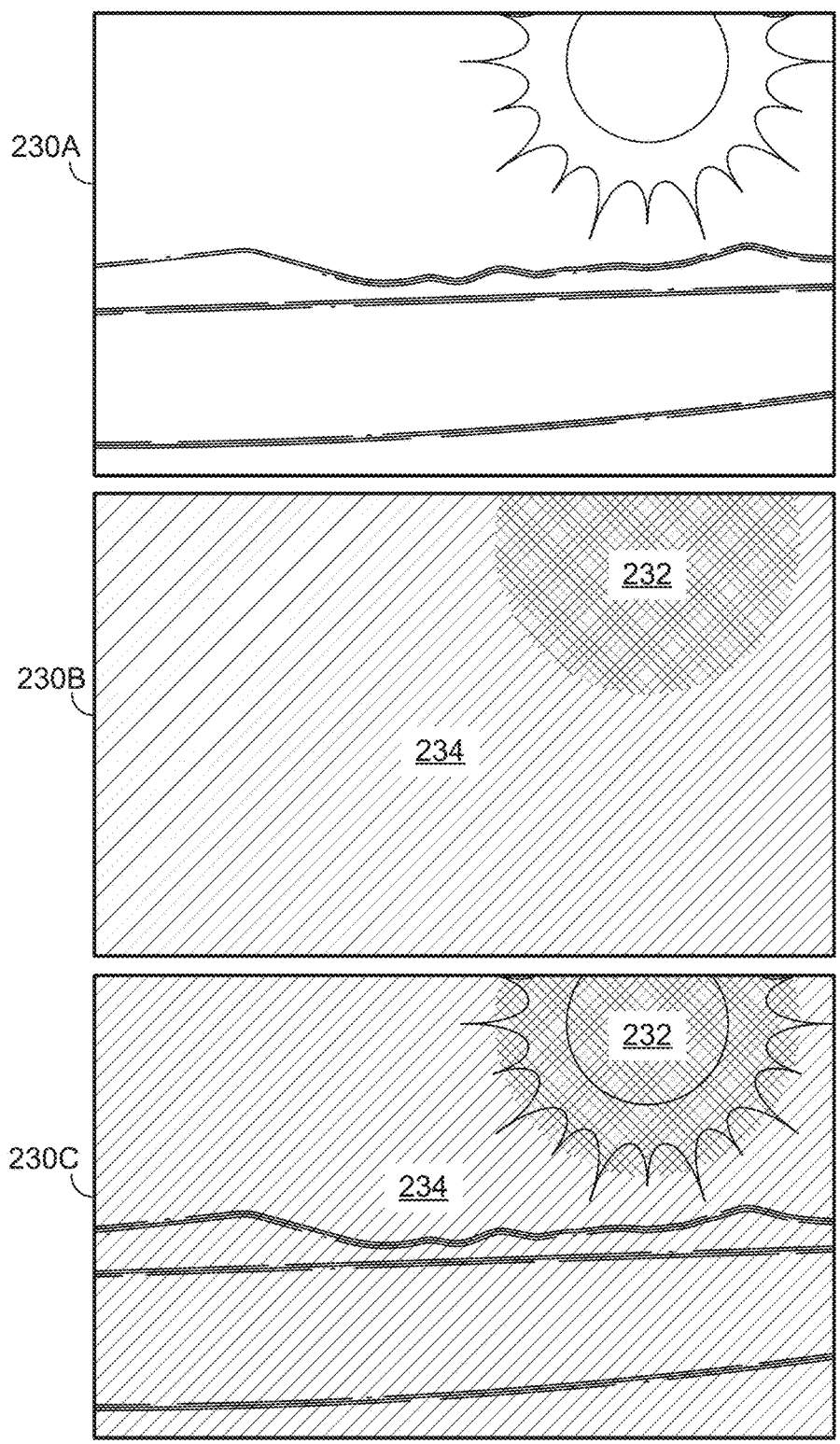

With reference to FIG. 2C, FIG. 2C is yet another example output of a machine learning model with respect to sensor blindness, in accordance with some embodiments of the present disclosure. For example, the machine learning model(s) 104 may use image data representative of input image 230A as input and may output an image mask 230B including the image blindness regions 232 and 234. Although not clearly illustrated, the majority of the image 230A may be obscured or blurred by precipitation, debris, or glare or reflections from sunlight (as indicated by the blurred representations of the environment in the image 230A). The image mask 230B may be generated based on the blindness region(s) 108 and associated blindness classification(s) 110 and/or blindness attribute(s) 112 computed by the machine learning model(s) 104. For example, the blindness region 232 may be classified as a blocked region and the pixels in the blindness region 232 may be classified as blocked pixels. In addition, the blindness region 234 may be classified as a blurred region and the pixels in the blindness region 234 may be classified as blurred pixels. In addition to the blindness classifications 110, the blindness regions 232 and 234 may also have associated blindness attributes 112. For example, the blurred classification may have associated attributes such as glare and/or heavy (indicating a heavy glare) and the blocked classification may have associated attributes such as glare, heavy, and day (indicating a heavy glare during the day). Visualization 230C illustrates image 230A with the image mask 230B overlaid. For example, with respect to the image 230A, the determination of drivability 122 may be low, such that the image 230A is not useful for autonomous or semi-autonomous driving operations. This may be because a large portion—as indicated by the blindness percentage 120, for example—of the image 230A is blurred, and the portion includes the driving surface where the control decision(s) 124 may be affected. As another example, assuming the blindness region 234 were computed to have a blindness attribute 112 of "light" rather than "heavy", the portions of the image 230A corresponding to the blindness region 234 may be determined to be usable because the blindness region 234 includes all of the driving surface, whereas the blocked blindness region 232 includes only the sky.

The blindness classifications 110 and blindness attributes 112 described with respect to FIGS. 2A-2C are for example purposes only, and are not intended to be limiting. As such, and as described, the machine learning model(s) 104 may be trained to compute any number of different types of blindness classifications 110 and/or blindness attributes 112 without departing from the scope of the present disclosure.

Figure 3:
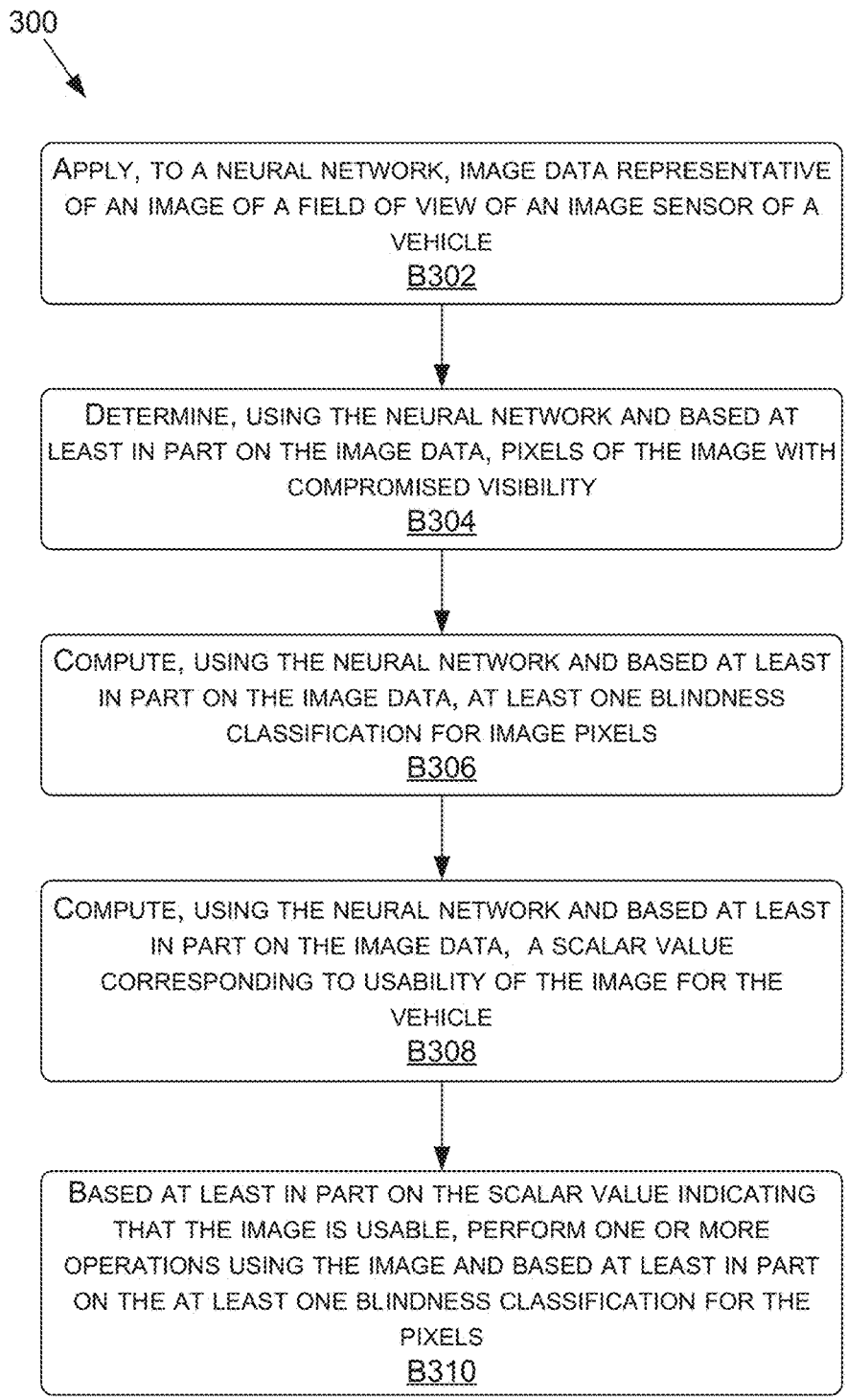
FIG. 3 is a flow diagram showing a method for detecting and classifying blindness in sensor data, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media.

The method 300 may be provided by a standalone application, a service or hosted service (standalone or in combination with another hosted service), or a plug-in to another product, to name a few. In addition, the method 300 is described, by way of example, with respect to the process 100 of FIG. 1. However, this method 300 may additionally or alternatively be executed by any one system, or any combination of systems, including, but not limited to, those described herein.

FIG. 3 is a flow diagram showing a method 300 for detecting and classifying blindness in sensor data, in accordance with some embodiments of the present disclosure. The method 300, at block B302, includes applying, to a neural network, image data representative of an image of a field of view of an image sensor of a vehicle. For example, image data (e.g., the sensor data 102) from an image sensor of a vehicle (e.g., the vehicle 700) may be applied (e.g., as an input) to the machine learning model(s) 104 (e.g., a neural network, such as a DNN).

The method 300, at block B304, includes determining, using the neural network and based at least in part on the image data, pixels of the image with compromised visibility. For example, the machine learning model(s) 104 may compute the blindness region(s) 108 (e.g., regions with associated blindness, compromised visibility, another impairment, and/or the like) and/or pixels associated therewith.

The method 300, at block B306, includes computing, using the neural network and based at least in part on the image data, at least one blindness classification for pixels of the image. For example, the machine learning model(s) 104 may determine the blindness classification(s) 110 corresponding to the blindness region(s) 108 and/or the pixels associated therewith.

The method 300, at block B308, includes computing, using the neural network and based at least in part on the image data, a scalar value corresponding to usability of the image by a vehicle. For example, the machine learning model(s) 104 may determine the scalar value 114 corresponding to usability of the image by the vehicle 700. Where the scalar value 114 indicates usability, one or more systems may process the instance of the sensor data for making one or more determinations. Alternatively, where the scalar value 114 indicates lack of usability, one or more systems may disregard, or filter out, the instance of the sensor data for making one or more determinations.

The method 300, at block B310, includes, when the scalar values indicate that the image is usable, performing one or more operations using the images and based at least in part on one blindness classification for each of the pixels. For example, control decision(s) 124 may be performed based on the scalar value 114, the blindness classification 110, and/or the blindness attributes 112. In some examples, the output of the agreement check 130 may further be used in making the determination of the control decisions 124. The one or more operations may include, in some non-limiting embodiments, determining whether the sensor data, or instances thereof, are usable or not. For example, where not usable, an instruction may be generated to disregard or ignore predictions within the system corresponding to the instance of the sensor data (e.g., do not use this instance of the sensor data for path planning, world model updates, etc.).

Training a DNN for Sensor Blindness Detection

During training, the DNN may be trained with training images that are encoded with region and context-based labels and classifications. In some examples, the training images may also be augmented via color and spatial augmentation. For example, color augmentation may be used to train the network to ignore colors in the sky. In another example, spatial augmentation may be used to train the neural network to ignore blindness that is caused by the ego-vehicle upon which the image sensors is mounted or otherwise attached to showing up in portions of the image. The neural network may be trained with labeled images using multiple iterations until the value of loss function of the network is below a threshold. The loss function may be used to measure error in the predictions as compared to the ground truth (e.g., the labels or annotations corresponding to regions of blindness and corresponding classifications) and, in embodiments, gradients of the loss function may be iteratively computed with respect to training parameters. An optimizer, such as an Adam optimizer, stochastic gradient descent, or another type of optimization algorithm, may be used during training. The training process may be reiterated until the trained parameters converge to optimum, desired, or acceptable values.

Figure 4:
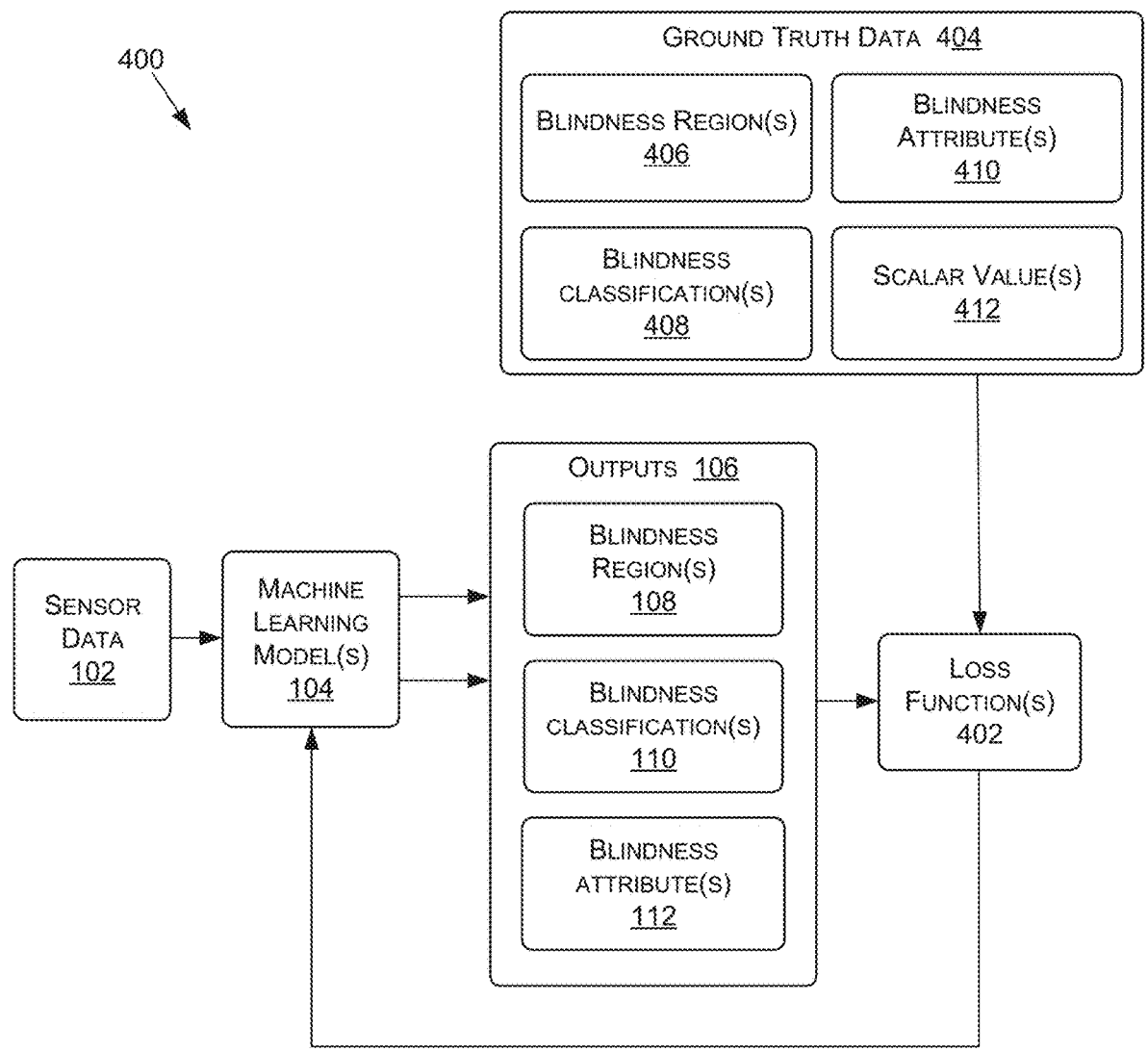
FIG. 4 is a data flow diagram illustrating a process for training a machine learning model for sensor blindness detection, in accordance with some embodiments of the present disclosure.

Now referring to FIG. 4, FIG. 4 is a data flow diagram illustrating a process 400 for training a machine learning model for sensor blindness detection, in accordance with some embodiments of the present disclosure. The process 400 may be used for training any of the machine learning model(s) 104, such as but not limited to those described herein. The machine learning model(s) 104 may be trained using sensor data, such as the sensor data 102 described herein. In some examples, when used for training, the sensor data 102 may be referred to as training data. Although the sensor data 102 is primarily discussed with respect to image data representative of image(s), this is not intended to be limiting. In some embodiments, for example, the sensor data 102 may include data from one or more LIDAR sensors, RADAR sensors, SONAR sensors, ultrasonic sensors, IMU sensors, and/or other sensor types (e.g., sensors and/or cameras described with respect to FIGS. 7A-7C).

The sensor data 102 used for training may include original images (e.g., as captured by one or more image sensors), down-sampled images, up-sampled images, cropped or region of interest (ROI) images, labeled images annotated for or outputted from other systems, flipped on an axis or otherwise augmented images, and/or a combination thereof. The sensor data 102 may be images captured by one or more sensors (e.g., cameras) of various vehicles (e.g., the vehicle 700), and/or may be images captured from within a virtual environment used for testing and/or generating training images (e.g., a virtual camera of a virtual vehicle within a virtual or simulated environment). In some examples, the sensor data 102 may include images from a data store or repository of training images (e.g., images of driving surfaces). In some other examples, the sensor data 102 may include images with artificial blindness classifications (e.g., blur, block) applied. In other examples, the sensor data 102 may include training images and/or resulting images derived from other neural networks.

The machine learning model(s) 104 may be trained using the images (and/or other sensor data 102) as well as corresponding ground truth data 404. The ground truth data 404 may include annotations, labels, masks, and/or the like. The machine learning model(s) 104 may be trained with training images that are encoded with region and context-based labels and classifications. In some embodiments, ground truth data 404 may be generated based on a set of predefined rules or policies in order to encode the contextual, region-based information. This information may later be useful in accurately detecting and classifying sensor blindness based on contextual information when deployed in real-time.

In some embodiments, the ground truth data 404 may include blindness region(s) 406, blindness classification(s) 408, blindness attribute(s) 410 (e.g., the classifications and attributes encoded to correspond to one or more blindness regions or pixels in the blindness regions 406), and/or scalar value(s) 412 that correspond to the usability of the current instance of the sensor data 102. The ground truth data 404 may be generated within a drawing program (e.g., an annotation program), a computer aided design (CAD) program, a labeling program, another type of program suitable for generating the ground truth data 404, and/or may be hand drawn, in some examples. In any example, the ground truth data 404 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 404.

The blindness region(s) 406 may include annotations, or other label types, corresponding to regions including sensor blindness. The blindness region(s) 406 may be generated for each of the images or other sensor data representations of the sensor data 102 used for training the machine learning model(s) 104 that include associated blindness. The number of blindness regions 406 may correspond to the number of regions in the respective image. As described herein, the blindness region(s) 406 may be machine automated, human annotated, and/or otherwise generated. Depending on the embodiment, the blindness region(s) 406 may correspond to an arbitrary, free-form shape(s) or a polygon. As a non-limiting example, vertices (or polypoints) corresponding to polygons defining or delineating the blindness region(s) 406 may be generated, and a polygon rasterizer may generate the entirety of the polygon using the vertices.

The blindness region(s) 406 may include associated annotations or other label types corresponding to the blindness classification(s) 408 and/or the blindness attribute(s) 410. Each blindness region may be associated with a blindness classification. In some examples, the blindness classification(s) 408 may include classes of labels including, without limitation, a blocked area label, a blurred area label, a reflection area label, an open area label, a vehicle or ego-vehicle label, a sky label, a frame label, and/or another type. The labels may be used to classify the blindness regions 406 as represented by the sensor data. For example, in a training image, a blocked area label may encode an obstructed area; a blurred area label may encode a blurred area (e.g., not completely obstructed) area; a reflection area label may encode an area including a reflection of the vehicle 700 (e.g., the ego-vehicle), an open area label may encode a catch-all, which may further be defined using the blindness attributes 408 (e.g., light source, other, etc.); a vehicle label may encode an area including a portion of the vehicle 700; a sky label may encode an area including the sky; and a frame label may encode information pertinent to the entirety of the image (e.g., sensor information). In some examples, regions represented by the sensor data 102 that do not include associated blindness may be annotated as such, such as by including blindness classifications 408 and/or blindness attributes 410 including "clear" or "unobstructed".

Further, the ground truth data 404 may also include annotations for blindness attribute(s) 410. The blindness attribute(s) 410 may be associated—e.g., as sub-classifications—with the blindness classification(s) 408. For example, some or all of the blindness classifications 408 may be associated with one or more blindness attributes 410. The blindness attributes 410 may encode a cause (e.g., sun, snow, etc.), a degree (e.g., light, heavy, medium), a result (e.g., glare), an association (e.g., day, night), and/or other information corresponding to the blindness region(s) 406. For example, a blindness classification of a blurred or blocked area may be associated with one or more attributes including glare from sun, fog, water, mist, snow, frozen pane, day, night, broken lens, self-glare, mud, paper, leaf, etc. Similarly, a frame label may be associated with one or more attributes including camera forward left, camera rear right, camera forward right, camera rear right, camera rear center, camera front center, blind, not blind, etc. An open area may be associated with an attribute encoding a light source.

The ground truth data 404 may further include the scalar value(s) 412. For example, each instance of the sensor data 102 may be encoded with a binary or scalar value (e.g., true or false, 0 or 1, yes or no, etc.) and/or non-binary values (e.g., a percentage, value within a range, etc.). As such, the machine learning model(s) 104 may be trained to learn which blindness classifications 408 and/or blindness attributes 410 and the locations of their respective blindness regions 406 have the most impact on the usability of the sensor data 102. In some embodiments, such as where different scalar values 114 are associated with different applications and/or operations associated therewith, each instance of the sensor data 102 may have ground truth 404 for associated scalar values 412 for each application and/or operation.

In some examples, the sensor data 102 and the associated ground truth data 404 (e.g., the blindness region(s) 406) may be augmented using color augmentation, spatial augmentation, and/or other types of augmentation, such as but not limited to those described herein. For example, the sensor data 102 may undergo color augmentation to train the machine learning model(s) 104 to ignore colors in sky regions of the sensor data 102. This allows the machine learning model(s) 104 to recognize a road region or a sky region even when an input image includes variations in color or positioning. Further, this may also train the machine learning model(s) 104 to ignore blindness in the sky region as it can be trained to recognize sky as an unimportant region in images for sensor blindness detection. In this way, the machine learning model(s) 104 may be trained to recognize the sky region to have a blindness classification of sky area based on spatial context (e.g., near the horizon, if visible).

In embodiments, the sensor data 102 and the associated ground truth data 404 may undergo spatial augmentation to train the machine learning model(s) 104—such as to ignore blindness in the sky region and/or blindness caused by the vehicle 700 (e.g., the ego-vehicle) being depicted in the image. Further, spatial augmentation may be applied to the sensor data 102 during training by applying spatial transformations (e.g., flip, zoom, rotation) and using the augmented sensor data 102 to further train the machine learning model(s) 104 to recognize regions based on spatial context and pixel-level edge or intensity gradients.

As described herein, the number of output channels of the machine learning model(s) 104 may depend on the number of blindness classification(s) 408, the number of blindness attribute(s) 410, and/or the number of scalar value(s) 412 that the machine learning model(s) 104 is trained to predict. In some examples, the number of output channels may equal the sum of the number of classification and the number of attributes plus an extra channel(s) for the scalar value 412. In embodiments, the machine learning model(s) 104 may be trained using a higher number of output channels than used when deployed. For example, some channels (e.g., corresponding to attributes) may be turned off during deployment, such that the machine learning model(s) may recognize more contextual information than it outputs (e.g., the additional contextual information may aid in more accurate predictions without requiring the machine learning model(s) 104 to generate outputs for each of the trained blindness classification(s) 408 and/or blindness attribute(s) 410).

The machine learning model(s) 104 may be trained with sensor data 102 using multiple iterations until the value of loss function 402 is below a predetermined threshold. The loss function 402 may be used to measure loss (e.g., error) in the outputs (e.g., predictions generated by the machine learning model(s) 104) as compared to the ground truth data 404 (e.g., labels or annotations corresponding to the blindness region(s) 406, the blindness classification(s) 410, the blindness attribute(s) 410, and/or the scalar values 412). Any type of loss function may be used, such as cross entropy loss, mean squared error, mean absolute error, mean bias error, and/or other loss function types. In some examples, gradients of the loss function 402 may be iteratively computed with respect to training parameters. An optimizer, such as an Adam optimizer, stochastic gradient descent, or any other type of optimization algorithm may be used to optimize the loss function while training the machine learning model(s) 104. The machine learning model(s) 104 may be trained iteratively until the training parameters converge to optimum, desired, or accepted values.

FIGS. 5A-5D include illustrations of example annotations for use as ground truth data 404 (e.g., the blindness region(s) 406, the blindness classification(s) 408, and/or the blindness attribute(s) 410) for training a machine learning model(s) 104, in accordance with some embodiments of the present disclosure. FIGS. 5A-5D illustrate a few of the advantages of the present disclosure. For example, by generating and classifying the blindness region(s) 404 for training the machine learning model(s) 104 as described herein, the machine learning model(s) 104 may be trained to contextually predict sensor blindness and its causes in a region-based manner while learning the important areas represented by sensor data for autonomous or semi-autonomous driving purposes. To that end, blindness regions associated with the sensor data may be annotated to enable the system to be trained to accurately and efficiently perform correction measures in real-time or near real-time by personalizing the measures based on contextual information detected in the images.

Figure 5A:
FIGS. 5A-5D include illustrations of example annotations for use as ground truth data for training a machine learning model, in accordance with some embodiments of the present disclosure.

In the example of FIG. 5A, three regions may be annotated as the blindness region(s) 406—blindness region 502 (e.g. Blocked_area, Glare_from_sun), blindness region 504 (e.g., Blurred_area, Glare_from_sun, Fog, Light, Day), and blindness region 506 (e.g., My_own_car). Using this information, the machine learning model(s) 104 may be trained to predict potential blindness regions 108 as well as blindness classification(s) 110 and/or blindness attribute(s) 112 associated therewith. The three blindness regions may correspond to image 500 (e.g., may correspond to pixel locations of the image 500). For example, the blindness region 502 may be annotated with polylines or polypoints, and include a blindness classification 408 of a blocked area, and a blindness attribute(s) 410 of glare from sun. The blindness region 504 may include a blindness classification 408 of "blurred" and a blindness attribute(s) 410 of "glare from the sun," "fog," "light," and "day." The blindness regions 506 may include a blindness classification 408 of "my own car," or "ego-vehicle." Where "ego-vehicle" is the blindness classification 408, there may be no associated blindness attributes 410 because the machine learning model(s) 104 may be trained to ignore regions of the sensor data 102 corresponding to the ego-vehicle. As such, the image may be annotated into different regions and each region may further include contextual information as to a blindness classification and the causes for the type of blindness.

Figure 5B:
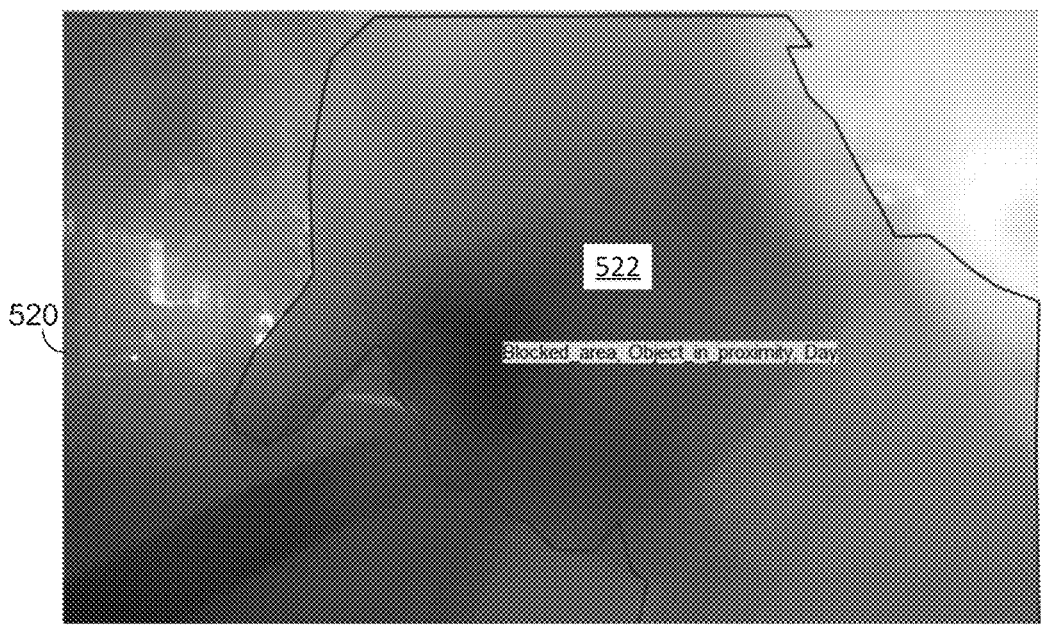

With reference to FIG. 5B, image 520 may be annotated to include the blindness region 522 which include associated ground truth data 404 indicating that the blindness classification 408 is "blocked" and the blindness attributes 410 are "object in proximity" and "day." In this way, the ground truth data 404 may include annotations for blindness region(s) 406 (e.g., blindness region 522), blindness classification(s) 408 (e.g., blocked area), and blindness attribute(s) 410 (e.g., object (e.g., pedestrian) in proximity, during the day) to train the machine learning model(s) 104 to recognize and classify sensor blindness based on the regions and associated causes thereof.

Figure 5C:
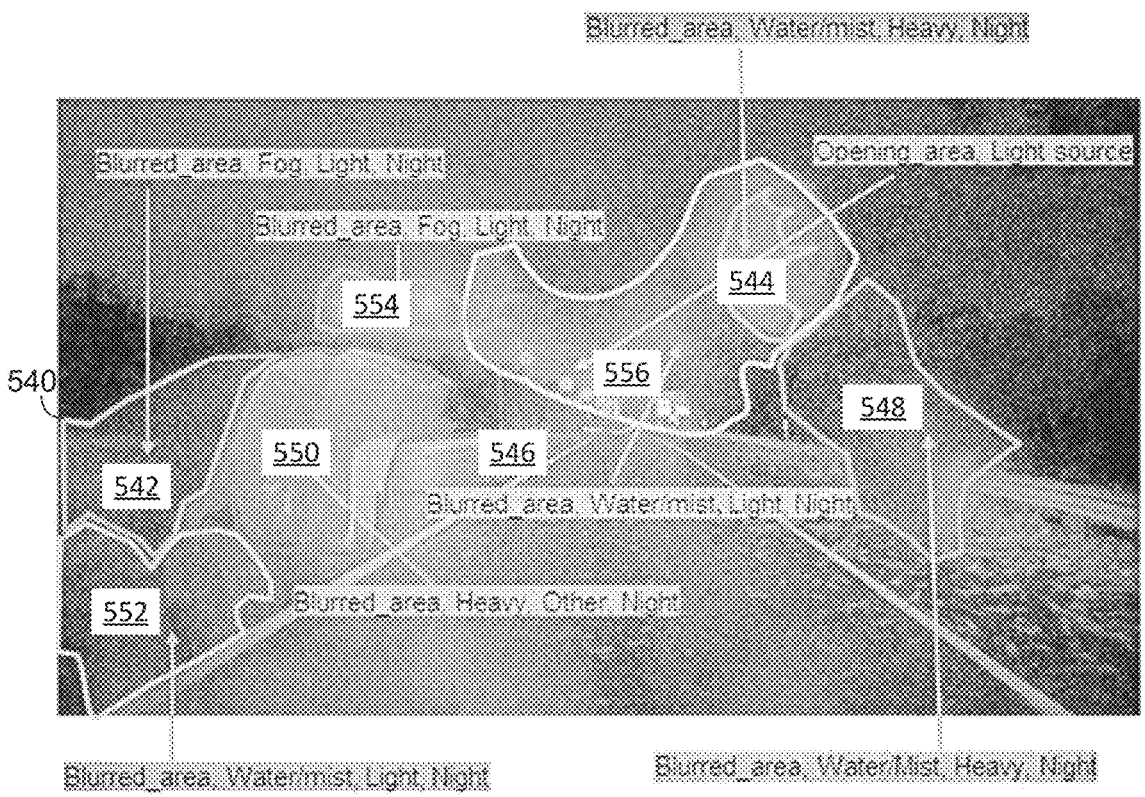
Figure 5D:

With respect to FIG. 5C, image 540 may be annotated to include the blindness region 542, 544, 546, 548, 550, 552, 554, and 558. Each blindness region may further include associated ground truth data 404 representative of blindness classifications 408 and/or blindness attributes 410. Similarly, with respect to FIG. 5D, FIG. 5D illustrates an example ground truth encoding of a sky region in image 560. The sky region may be annotated in training image 560 to indicate the sky near the horizon in the image 560. The sky region may be encoded as blindness region 562, and include a blindness classification 408 of "Sky_area." This may be used to train the machine learning model(s) 104 to learn to detect a sky region while ignoring the shades of blue. For example, as described herein, color augmentation may be applied to the image 560 to train the machine learning model(s) 104 to be insensitive or less sensitive to color variations in sky regions of images. The labeling may also train the machine learning model(s) to learn that the sky region—when blocked or blurred—is not as important of a region for determining usability of sensor data.

Figure 6:
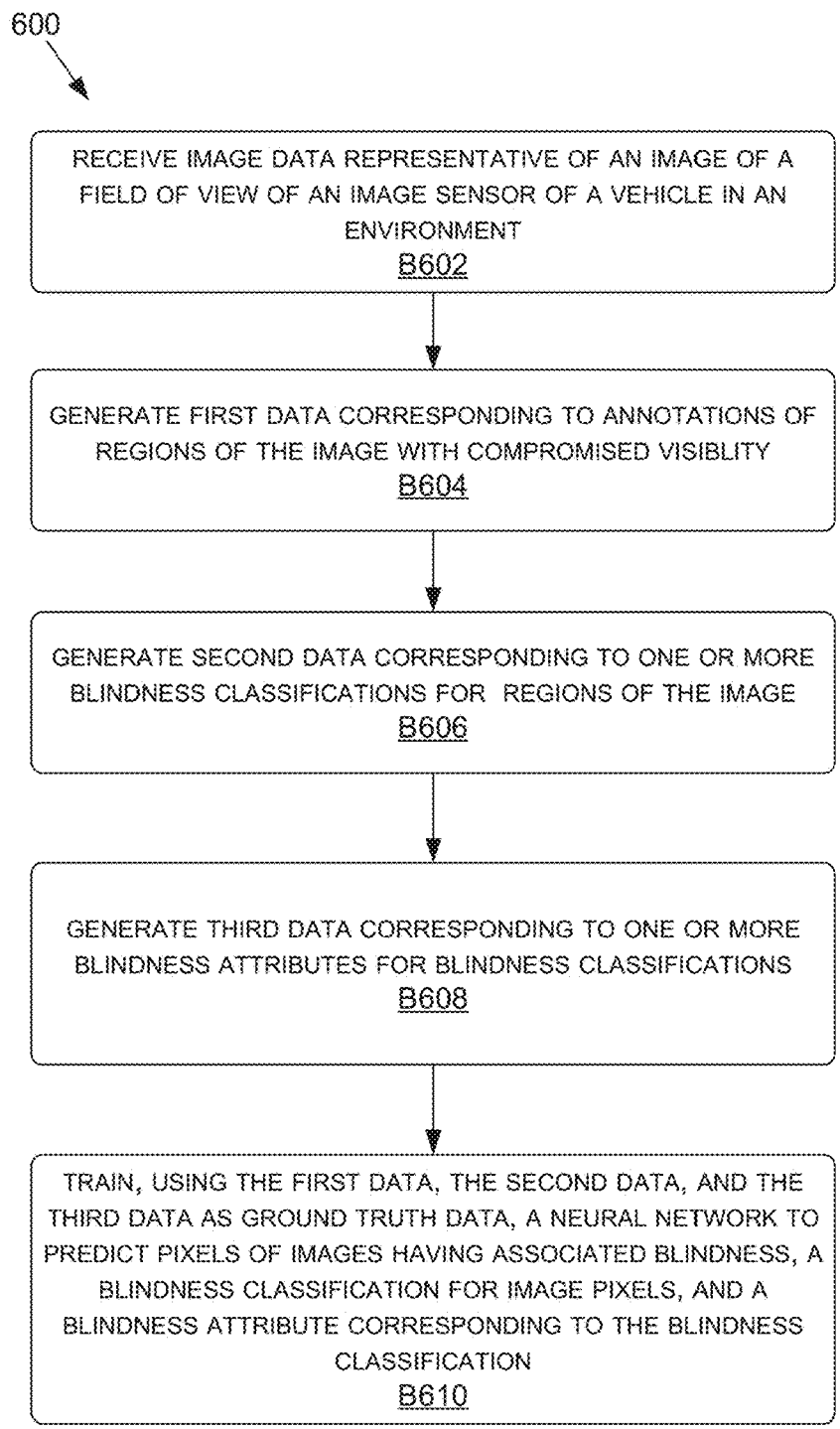
FIG. 6 is a flow diagram showing a method for training a machine learning model for sensor blindness detection and classification, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions computer storage media. The method 600 may be provided by a standalone application, a service or hosted service (standalone or in combination with another hosted service), or a plug-in to another product, to name a few. In addition, the method 600 is described, by way of example, with respect to the process 400 of FIG. 4. However, this method 600 may additionally or alternatively be executed by any one system, or any combination of systems, including, but not limited to, those described herein.

FIG. 6 is a flow diagram showing a method 600 for training a machine learning model for blindness detection and classification, in accordance with some embodiments of the present disclosure. The method 600, at block B602, includes receiving image data representative of an image of a field of view of an image sensor of a vehicle in an environment. For example, the sensor data 102 (as image data) may be received, where the image data is representative of an image of a field of view of an image sensor of the vehicle 700 in an environment.

The method 600, at block B604, includes generating first data corresponding to annotations of regions of the image having associate blindness. For example, data corresponding to annotations of blindness region(s) 406 in ground truth data 404 may be generated.

The method 600, at block B606, includes generating second data corresponding to one or more blindness classifications for each region of the regions of the image. For example, blindness classification(s) 408 may be generated for blindness region(s) 406.

The method 600, at block B608, includes generating third data corresponding to one or more blindness attributes for the one or more blindness classifications. For example, blindness attribute(s) 410 may be generated for association with the blindness classification(s) 408.

The method 600, at block B610, includes training, using the first data, the second data, and the third data as ground truth data, a neural network to predict pixels of images with compromised visibility, a blindness classification for (e.g., each of) the pixels, and a blindness attribute corresponding to the blindness classification. For example, the machine learning model(s) 104 may be trained using the blindness region(s) 406 (e.g., regions with compromised visibility or similar impairments), the blindness classification(s) 408, and the blindness attribute(s) 410 as ground truth data 404 to predict the blindness region(s) 108, the blindness classification(s) 110, and the blindness attribute(s) 112 as outputs 106 (FIG. 1).

Example Autonomous Vehicle

Figure 7A:
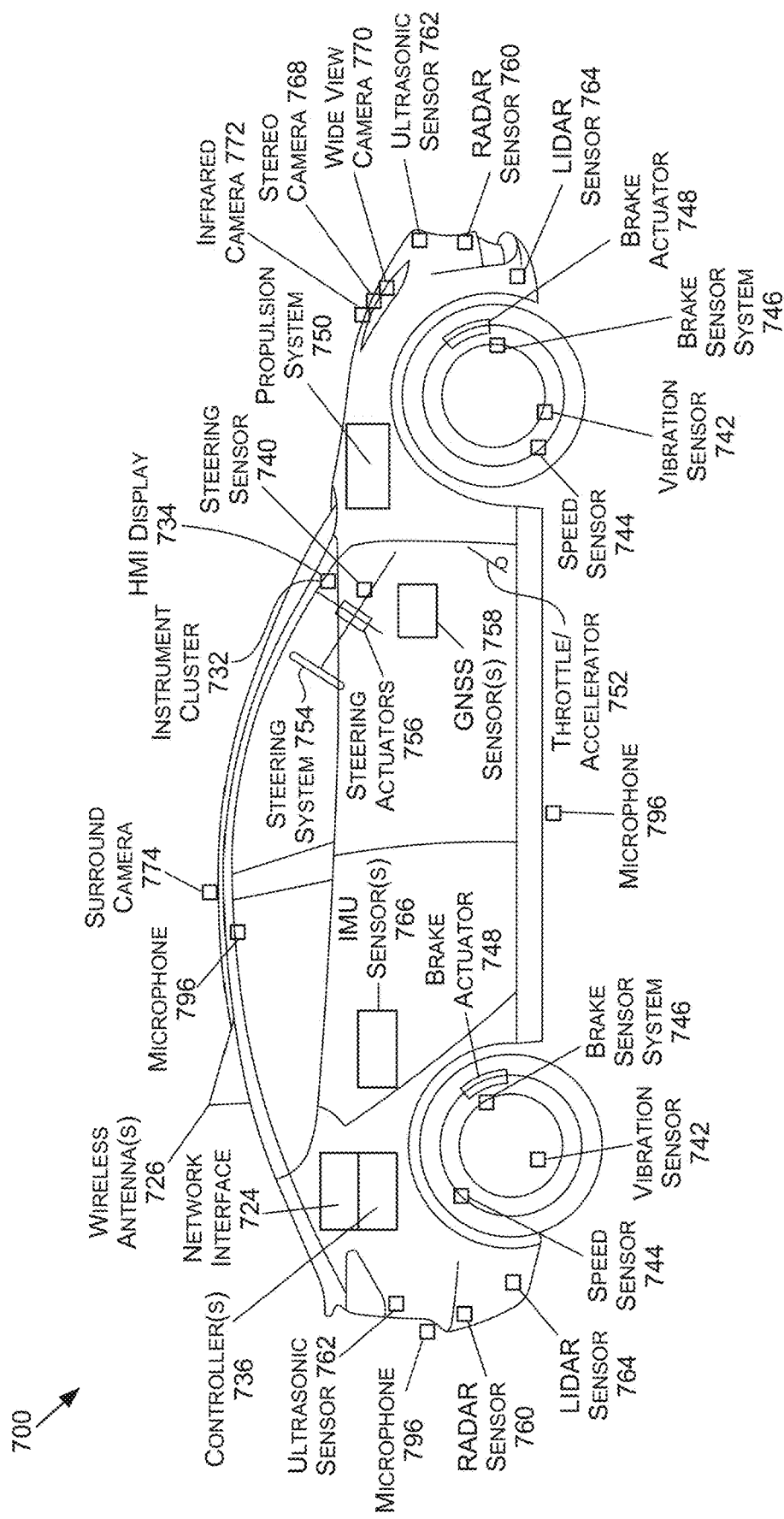
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201607, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 776, stereo camera(s) 768, wide-view camera(s) 770 (e.g., fisheye cameras), infrared camera(s) 772, surround camera(s) 774 (e.g., 360 degree cameras), long-range and/or mid-range camera(s) 778, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
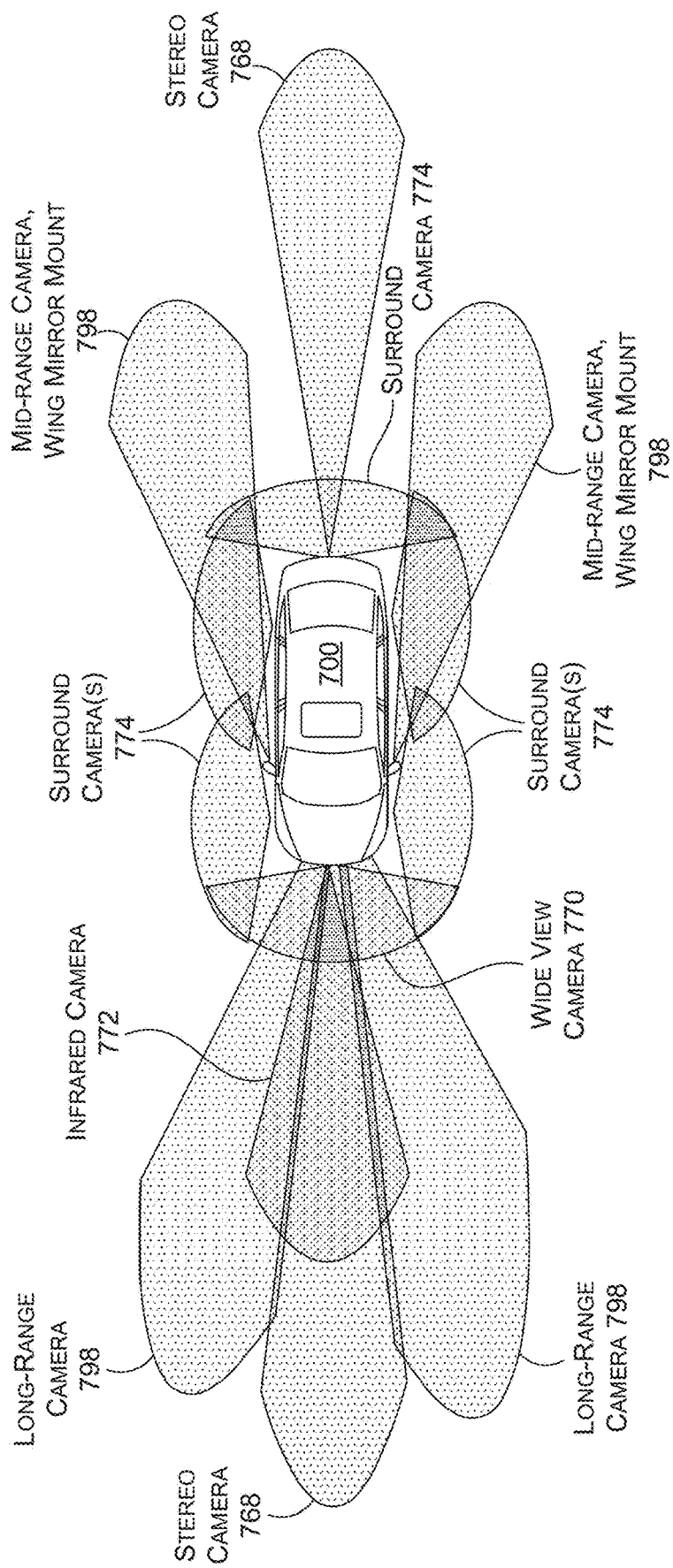
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 778 (e.g., a long-view stereo camera pair) may be used for depth-based object detection, especially for objects for which a neural network has not yet been trained. The long-range camera(s) 778 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 778, stereo camera(s) 768), infrared camera(s) 772, etc.), as described herein.

Figure 7C:
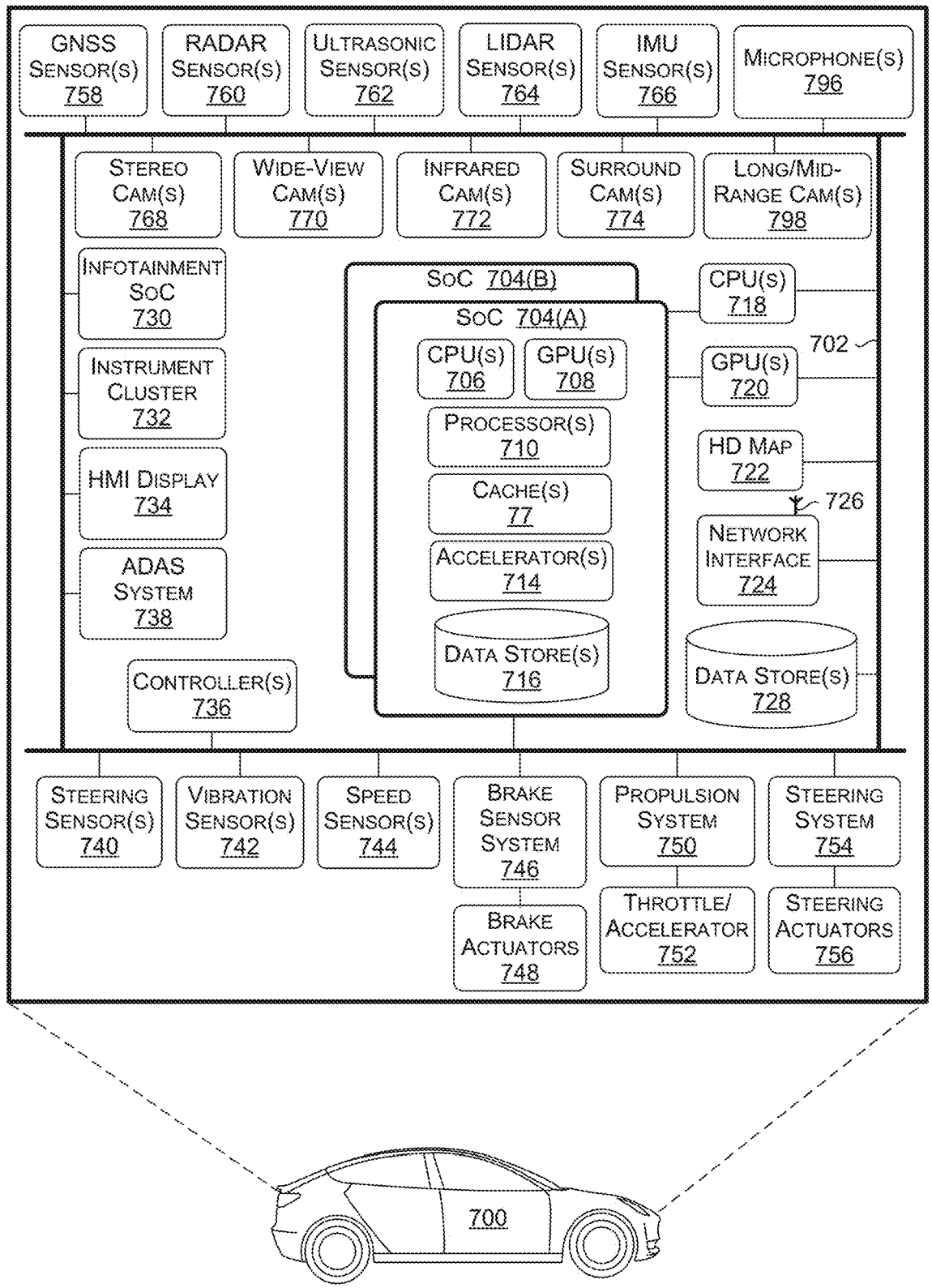
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 76 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 700 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 714 (e.g., the hardware accelerator cluster) have a wide array of uses for autonomous driving.

The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 776 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 776 placed in and/or around the vehicle 700. The microphone(s) 776 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 778, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
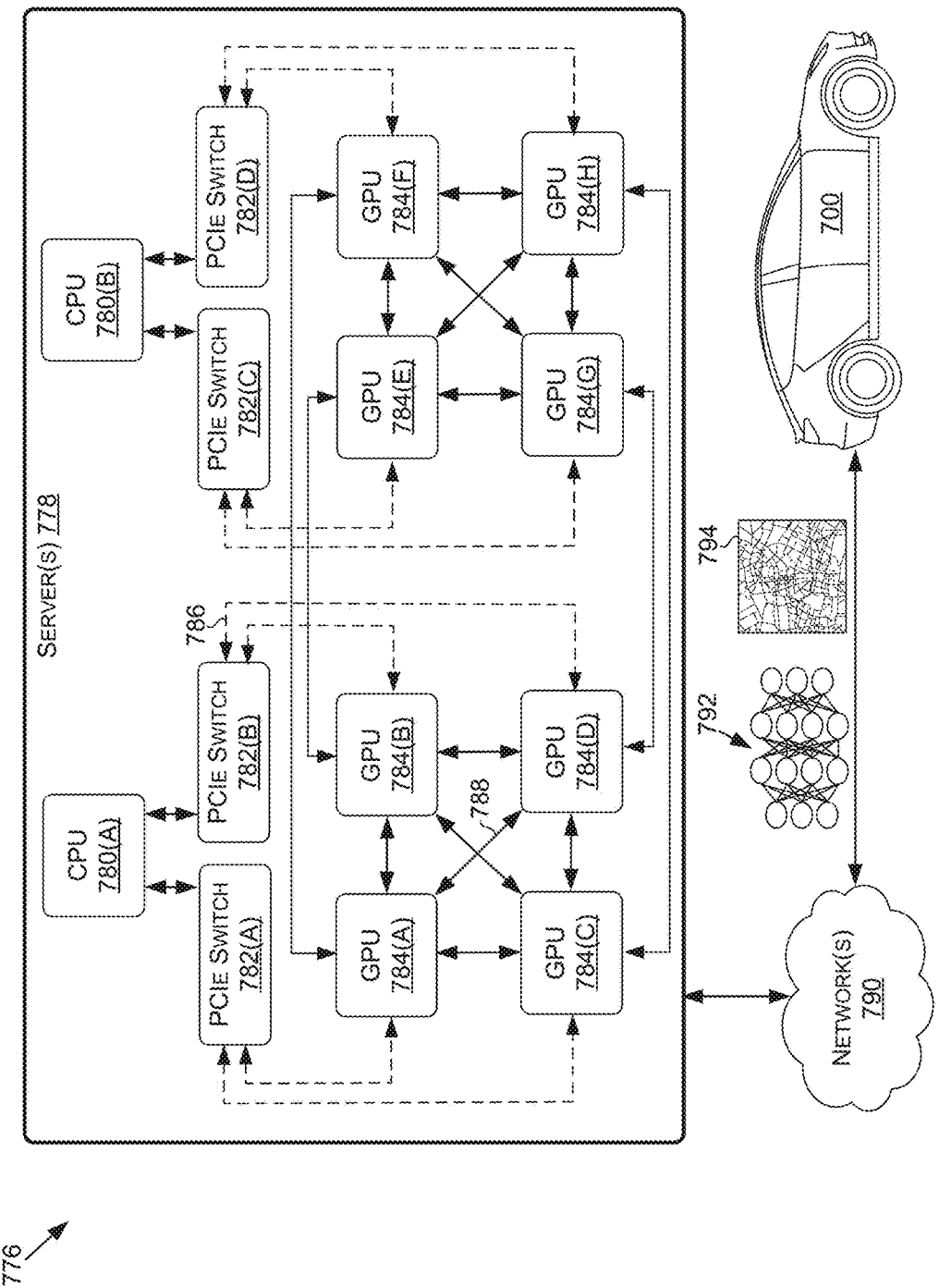
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 770, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 770 and from the vehicles, image data representative of images showing unexpected or changed road conditions, such as recently commenced road-work. The server(s) 778 may transmit, over the network(s) 770 and to the vehicles, neural networks 772, updated neural networks 772, and/or map information 774, including information regarding traffic and road conditions. The updates to the map information 774 may include updates for the HD map 722, such as information regarding construction sites, potholes, detours, flooding, and/or other obstructions. In some examples, the neural networks 772, the updated neural networks 772, and/or the map information 774 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 770, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
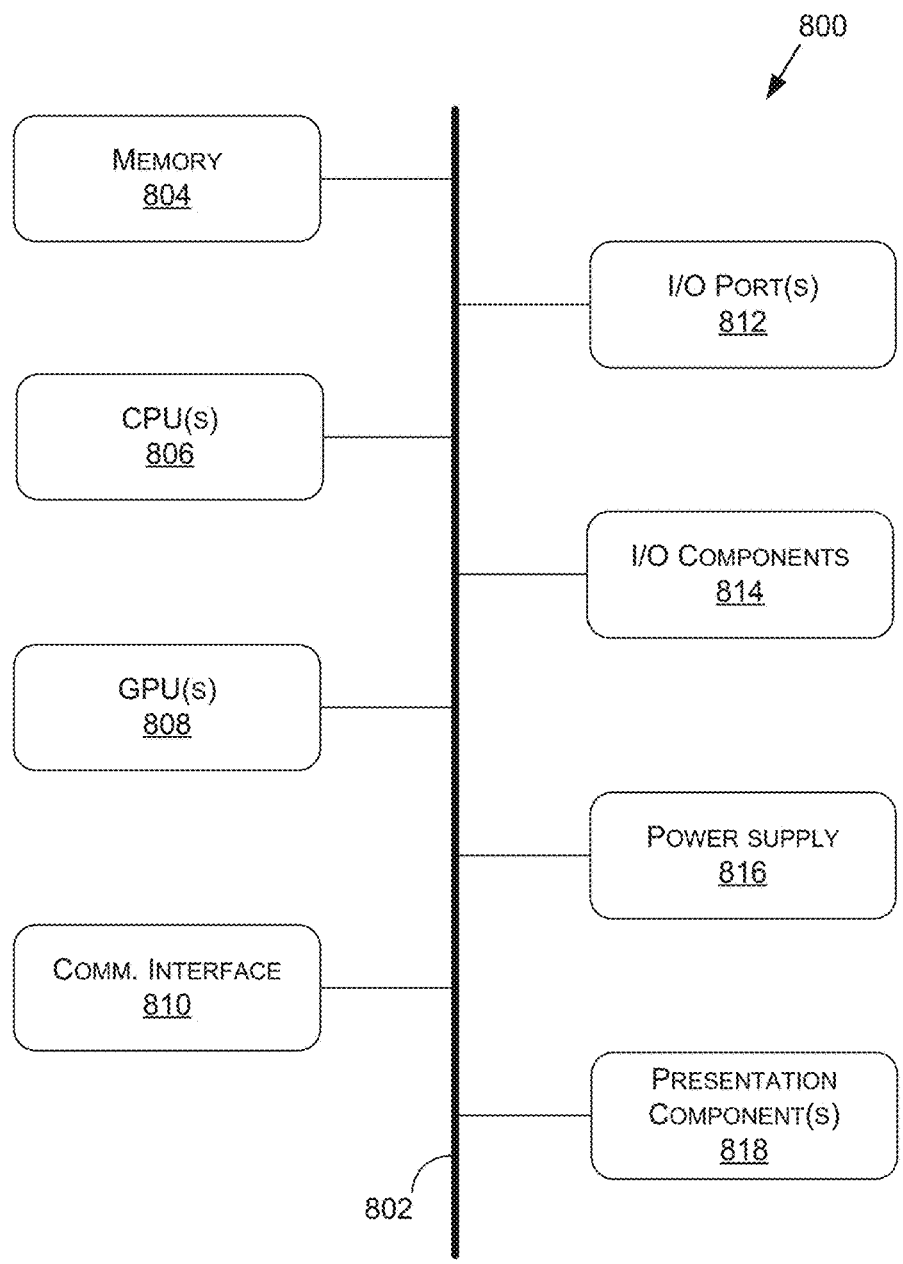
FIG. 8 is a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
computing, using a neural network and based at least in part on image data representative of an image of a field of view of one or more sensors of a vehicle, first data indicative of one or more pixels of the image with compromised visibility;
computing, using the neural network and based at least in part on the image data, second data indicative of at least one blindness classification from a plurality of blindness classifications for the one or more pixels with compromised visibility;
computing, using the neural network and based at least in part on the image data, third data indicative of a scalar value representative of a usability of the image to perform one or more operations corresponding to the vehicle; and
based at least in part on a location in the field of view associated with the one or more pixels with compromised visibility and the at least one blindness classification, performing at least one operation of the one or more operations based at least in part on the scalar value being above a threshold value.

2. The method of claim 1, wherein the at least one blindness classification from the plurality of blindness classifications includes at least one of a blocked area, a blurred area, a reflection area, a sky area, or a frame label.

3. The method of claim 1, further comprising, for each of the one or more pixels, computing, using the neural network, fourth data indicative of at least one blindness attribute corresponding to the at least one blindness classification, wherein the performing the at least one operation is further based at least in part on the at least one blindness attribute.

4. The method of claim 3, wherein the at least one blindness attribute includes at least one of glare, fog, water, mist, snow, frozen, day, night, broken lens, self-glare, mud, paper, leaf, person, object, heavy, light, or light source.

5. The method of claim 1, further comprising weighting at least one of the one or more pixels with compromised visibility or the at least one blindness classification for each of the one or more pixels with compromised visibility with prior computations of the neural network corresponding to prior images in a sequence of images including the image.

6. The method of claim 1, further comprising:
determining importance values corresponding to regions of the image, the importance values indicative of an importance of a portion of an environment of the vehicle depicted in the region to the performing the one or more operations,
wherein the performing the at least one operation is based at least in part on an importance value of a respective region of the regions corresponding to the one or more pixels with compromised visibility.

7. The method of claim 1, wherein the one or more pixels with compromised visibility are first pixels, and the method further comprises:
computing, using a computer vision algorithm, second pixels of the image having compromised visibility; and
comparing the second pixels with the first pixels to determine an accuracy of the neural network in computing the first pixels with compromised visibility.

8. The method of claim 7, further comprising:
computing, using the neural network and based at least in part on the image data, fourth data representative of a saliency map indicative of respective importance values for regions of the image,
wherein the comparing the second pixels with the first pixels includes comparing a first subset of the second pixels within a region of the regions with a second subset of the first pixels within the region, the region having an importance value above a threshold importance value.

9. The method of claim 1, wherein the vehicle is a virtual vehicle, the one or more sensors correspond to one or more virtual sensors, and the field of view is of the one or more virtual sensors in a simulated environment, and further wherein the performing the at least one operation includes performing the at least one operation with respect to the virtual vehicle in the simulated environment.

10. A system comprising:
one or more image sensors to generate image data of an environment around a vehicle, the image data representative of an image;
a computing device including one or more processing devices and one or more memory devices communicatively coupled to the one or more processing devices storing programmed instructions thereon, which when executed by the one or more processing devices causes the instantiation of:
a blindness determiner to:
compute, using a neural network and based at least in part on the image data, one or more pixels of the image with compromised visibility; and
compute, using the neural network and based at least in part on the image data, one or more blindness classifications corresponding to the one or more pixels of the image from a plurality of blindness classifications; and
a control component to perform one or more operations using the image based at least in part on a location of the one or more pixels with compromised visibility and the one or more blindness classifications.

11. The system of claim 10, further comprising:
a usability determiner to compute, using the neural network and based at least in part on the image data, a scalar value corresponding to each operation of the one or more operations,
wherein the performing the one or more operations is further based at least in part on the scalar value being greater than a threshold value with respect to at least one operation of the one or more operations.

12. The system of claim 10, wherein the blindness determiner is further to compute, using the neural network and based at least in part on the image data, one or more blindness attributes corresponding to the one or more pixels with compromised visibility,
wherein the performing the one or more operations is further based at least in part on the one or more blindness attributes.

13. The system of claim 10, further comprising:
an additional blindness determiner to determine, using a computer vision algorithm, comparative pixels with compromised visibility; and
an agreement verifier to compare the one or more pixels with compromised visibility to the comparative pixels to determine an agreement score.

14. The system of claim 10, wherein:
the one or more blindness classifications correspond to a type of blindness and include at least one of a blocked area, a blurred area, a reflection area, a sky area, or a frame label;
the blindness determiner is further to compute, using the neural network and based at least in part on the image data, one or more blindness attributes corresponding to the one or more pixels with compromised visibility, the one or more blindness attributes corresponding to a cause of blindness and including at least one of flare, fog, water, mist, snow, frozen, day, night, broken lens, self-glare, mud, paper, leaf, person, object, heavy, light, or light source; and the performing the one or more operations is further based at least in part on the one or more blindness attributes.

* * * * *